US011600023B2

(12) United States Patent
Lebrun et al.

(10) Patent No.: US 11,600,023 B2
(45) Date of Patent: Mar. 7, 2023

(54) OPTICAL CENTER CALIBRATION

(71) Applicant: GoPro, Inc., San Mateo, CA (US)

(72) Inventors: Marc Lebrun, Issy-les-Moulineaux (FR); Karl Krissian, Fontenay-aux-Roses (FR); Vincent Riauté, Carrières sous Poissy (FR); Giuseppe Moschetti, Saint Cloud (FR)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 17/404,927

(22) Filed: Aug. 17, 2021

(65) Prior Publication Data

US 2022/0065621 A1  Mar. 3, 2022

Related U.S. Application Data

(60) Provisional application No. 63/072,532, filed on Aug. 31, 2020.

(51) Int. Cl.
*G06T 7/80* (2017.01)
(52) U.S. Cl.
CPC ............ *G06T 7/80* (2017.01); *G03B 2205/00* (2013.01)
(58) Field of Classification Search
CPC ....................................................... G06T 7/80
See application file for complete search history.

(56) References Cited

U.S. PATENT DOCUMENTS

| 2,186,610 | A | 1/1940 | Leavitt |
| 3,133,140 | A | 5/1964 | Winchell |
| 4,451,130 | A | 5/1984 | Yan |
| 5,077,567 | A | 12/1991 | Haraguchi |
| 5,828,406 | A | 10/1998 | Parulski |
| 6,079,883 | A | 6/2000 | Mori |
| 6,768,509 | B1* | 7/2004 | Bradski ............... G06T 7/194 348/E13.016 |
| 7,161,749 | B2 | 1/2007 | Sakurai |
| 7,717,630 | B1 | 5/2010 | Wan |
| 8,294,988 | B2 | 10/2012 | Cook |

(Continued)

FOREIGN PATENT DOCUMENTS

| EP | 1619882 A2 | 1/2006 |
| WO | 2020055511 A1 | 3/2020 |

OTHER PUBLICATIONS

Wikipedia, Magic number (programming), https://en.wikipedia.org/wiki/Magic_number_%28programming%29, retrieved on Aug. 4, 2020, 8 pages.

(Continued)

*Primary Examiner* — Brian P Yenke
(74) *Attorney, Agent, or Firm* — Young Basile Hanlon & MacFarlane, P.C.

(57) ABSTRACT

Optical center calibration may include obtaining one or more parameters for optical center calibration, obtaining an input image captured by an image capture device using a lens, and determining a calibration circle using the parameters and the input image. Determining the calibration circle may include extracting rays using the input image, estimating contours using the input image and the rays, and estimating the calibration circle using the input image and the contours. The calibration may be iteratively improved by repeating calibration based on the input image and a previous iteration of optical center calibration.

20 Claims, 24 Drawing Sheets

(56) References Cited

U.S. PATENT DOCUMENTS

| | | | |
|---|---|---|---|
| 9,420,276 B2* | 8/2016 | Liang | G02B 27/0075 |
| 9,639,935 B1* | 5/2017 | Douady-Pleven | H04N 19/90 |
| 9,743,001 B1 | 8/2017 | Stec | |
| 9,995,990 B2 | 6/2018 | Lim | |
| 10,401,705 B2 | 9/2019 | Lim | |
| 10,630,921 B2* | 4/2020 | Douady-Pleven | H04N 5/3572 |
| 10,701,249 B1 | 6/2020 | Guo | |
| 10,845,675 B2 | 11/2020 | Lim | |
| 11,277,544 B2* | 3/2022 | Powell | H04N 17/002 |
| 2002/0067855 A1* | 6/2002 | Chiu | G06T 7/80 382/199 |
| 2004/0240870 A1 | 12/2004 | Stiehler | |
| 2006/0007551 A1 | 1/2006 | Sakurai | |
| 2008/0094708 A1 | 4/2008 | Huang | |
| 2008/0111912 A1* | 5/2008 | Chen | H04N 17/002 348/335 |
| 2009/0002823 A1 | 1/2009 | Law | |
| 2009/0091827 A1 | 4/2009 | Gauger | |
| 2010/0149408 A1 | 6/2010 | Ito | |
| 2010/0302638 A1 | 12/2010 | Cuadra | |
| 2013/0028590 A1 | 1/2013 | Hasuda | |
| 2013/0071101 A1 | 3/2013 | Idera | |
| 2013/0129338 A1 | 5/2013 | Dowell | |
| 2013/0258115 A1* | 10/2013 | Hansson | G06T 7/80 348/187 |
| 2014/0043733 A1 | 2/2014 | Huang | |
| 2015/0093104 A1 | 4/2015 | Clyne | |
| 2015/0097968 A1* | 4/2015 | Bergman | A61B 5/103 348/175 |
| 2015/0170399 A1* | 6/2015 | Li | H04N 13/398 345/426 |
| 2016/0066459 A1 | 3/2016 | Rayner | |
| 2016/0181722 A1 | 6/2016 | Tsai | |
| 2017/0102512 A1 | 4/2017 | Yamaoda | |
| 2017/0102513 A1 | 4/2017 | Ogata | |
| 2017/0119298 A1* | 5/2017 | Cheung | G06T 7/246 |
| 2017/0221223 A1* | 8/2017 | Hu | G06T 3/4007 |
| 2018/0017785 A1 | 1/2018 | Bulgajewski | |
| 2018/0091775 A1 | 3/2018 | Jung | |
| 2018/0143512 A1 | 5/2018 | Campbell | |
| 2019/0158709 A1 | 5/2019 | Petty | |
| 2019/0208099 A1 | 7/2019 | Cotoros | |
| 2019/0342473 A1 | 11/2019 | Clearman | |
| 2020/0026023 A1 | 1/2020 | Nagaoka | |
| 2021/0044725 A1* | 2/2021 | Powell | G06T 7/80 |
| 2021/0084281 A1* | 3/2021 | Douady | H04N 13/239 |
| 2021/0233274 A1* | 7/2021 | Silva | G06T 7/80 |
| 2021/0274067 A1 | 9/2021 | Crow | |
| 2021/0316669 A1* | 10/2021 | Wang | G01S 13/867 |
| 2022/0053153 A1* | 2/2022 | Guérin | G06T 5/50 |
| 2022/0070374 A1* | 3/2022 | Riauté | G02B 27/32 |
| 2022/0222856 A1* | 7/2022 | Tang | H04N 17/002 |

OTHER PUBLICATIONS

Geometric Image Transformations, https://docs.opencv.org/2.4/modules/imgproc/doc/geometric_transformations.html?highlight=resize#cv2.resize, OpenCV2.4.13.7, retrieved on Aug. 4, 2020, 11 pages.

Wikipedia, Histogram, https://en.wikipedia.org/wiki/Histogram#Cumulative_histogram, retrieved on Aug. 4, 2020, 7 pages.

Wikipedia, Median absolute deviation, https://en.wikipedia.org/wiki/Median_absolute_deviation, retrieved on Aug. 4, 2020, 3 pages.

Miscellaneous Image Transformations, https://docs.opencv.org/2.4/modules/imgproc/doc/miscellaneous_transformations.html#cvtcolor, OpenCV2.4.13.7, retrieved on Aug. 4, 2020, 12 pages.

Structural Analysis and Shape Descriptors, https://docs.opencv.org/2.4/modules/imgproc/doc/structural_analysis_and_shape_descriptors.html?highlight=minenclosingcircle#minenclosingcircle, retrieved on Aug. 4, 2020, 27 pages.

Wikipedia, Random sample consensus, https://en.wikipedia.org/wiki/Random_sample_consensus, retrieved on Aug. 4, 2020, 5 pages.

Scipy.optimize.minimize, https://docs.scipy.org/doc/scipy/reference/generated/scipy.optimize.minimize.html, retrieved on Aug. 4, 2020, 6 pages.

Structural Analysis and Shape Descriptors, https://docs.opencv.org/3.4/d3/dc0/group_imgproc_shape.html#ga17ed9f5d79ae97bd4c7cf18403e1689a, OpenCV, retrieved on Aug. 4, 2020, 12 pages.

Wikipedia, YUV, https://en.wikipedia.org/wiki/YUV, retrieved on Aug. 4, 2020, 9 pages.

International Search Report and Written Opinion for App. No. PCT/US2020/042749, dated Apr. 15, 2021, 10 pages.

International Search Report and Written Opinion for App. No. PCT/US2021/024462, dated Jul. 8, 2021, 10 pages.

International Search Report and Written Opinion for App. No. PCT/US2021/037757, dated Oct. 7, 2021, 6 pages.

U.S. Appl. No. 16/803,139, filed Feb. 27, 2020, Crow et al., entitled Heatsink of an Image Capture Device.

\* cited by examiner

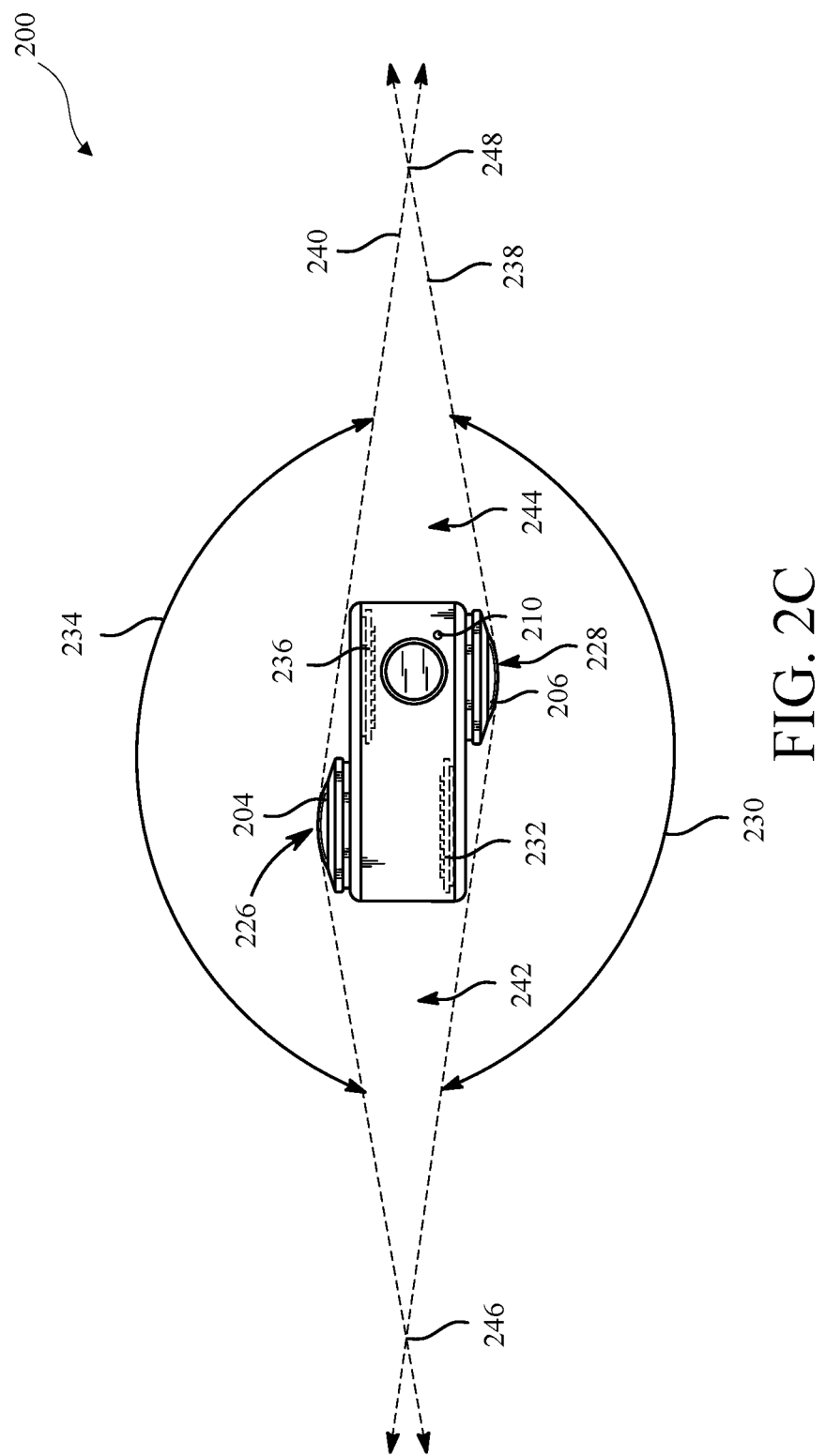

US 11,600,023 B2

OPTICAL CENTER CALIBRATION

CROSS-REFERENCE TO RELATED APPLICATION(S)

This application claims priority to and the benefit of U.S. Provisional Application Patent Ser. No. 63/072,532, filed Aug. 31, 2020, the entire disclosure of which is hereby incorporated by reference.

TECHNICAL FIELD

This disclosure relates to digital image and video capture and processing, including lens optical center calibration.

BACKGROUND

Image capture devices, such as cameras, may capture content as images or video. Light may be received and focused via a lens and may be converted to an electronic image signal by an image sensor. The image signal may be processed by an image signal processor to form an image, which may be stored and/or encoded. In some implementations, optical center calibration may be advantageous.

SUMMARY

Disclosed herein are implementations of optical center calibration.

An aspect of the disclosure relates to a method for optical center calibration. Optical center calibration may include obtaining one or more parameters for optical center calibration, obtaining an input image captured by an image capture device using a lens, and determining a calibration circle using the parameters and the input image. Determining the calibration circle may include extracting rays using the input image, estimating contours using the input image and the rays, and estimating the calibration circle using the input image and the contours. The calibration may be iteratively improved by repeating calibration based on the input image and a previous iteration of optical center calibration.

Another aspect of the disclosure relates to an image capture apparatus for optical center calibration. The image capture apparatus includes a lens, an image sensor configured to capture, using the lens, an input image, and an image processor. The image processor is configured to obtain one or more parameters for optical center calibration, obtain the input image, and determine a calibration circle using the parameters and the input image. To determine the calibration circle, the image processor is configured to extract rays using the input image, estimate contours using the input image and the rays, and estimate the calibration circle using the input image and the contours.

Another aspect of the disclosure relates to an image capture apparatus calibration system. The image capture apparatus calibration system may include an image capture apparatus and a calibration unit. The image capture apparatus may include a lens and an image sensor configured to capture, using the lens, an input image. The calibration unit may include a processor. The processor may be configured to obtain one or more parameters for optical center calibration, obtain the input image from the image capture apparatus, and determine a calibration circle using the parameters and the input image. To determine the calibration circle, the processor may be configured to extract rays using the input image, obtain contours using the input image and the rays, and obtain the calibration circle using the input image and the contours.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 2C is a top view of the image capture device of FIGS. 2A-B.

DETAILED DESCRIPTION

An image capture device may be designed and manufactured such that an optical center of a lens of the image capture device is expected to be aligned with a center of an image sensor of the image capture device. Factors, such as manufacturing variances, materials variances, physical force, temperature variances, materials aging, and the like, may cause or contribute to variances of the alignment or orientation of the optical center of the lens with respect to the center of the image sensor (misalignment). Uncalibrated, or unidentified, misalignment may reduce the accuracy, efficiency, or both of signal processing, such as for image or video stabilization.

To improve the accuracy, efficiency, or both, of the image capture apparatus, the alignment or orientation of the optical center of the lens with respect to the center of the image sensor may be calibrated (optical center calibration), such as automatically, which may include determining the optical center of the lens. Optical center calibration may be performed using an image captured by the image capture device using the lens Optical center calibration may include iteratively improving the optical center calibration over multiple iterations. Iterations of optical center calibration may include extracting rays from an input image, estimating contours corresponding to transitions in the input image from image content to non-content portions of the input image, and estimating a calibration circle based on the contours.

Figure 1A:
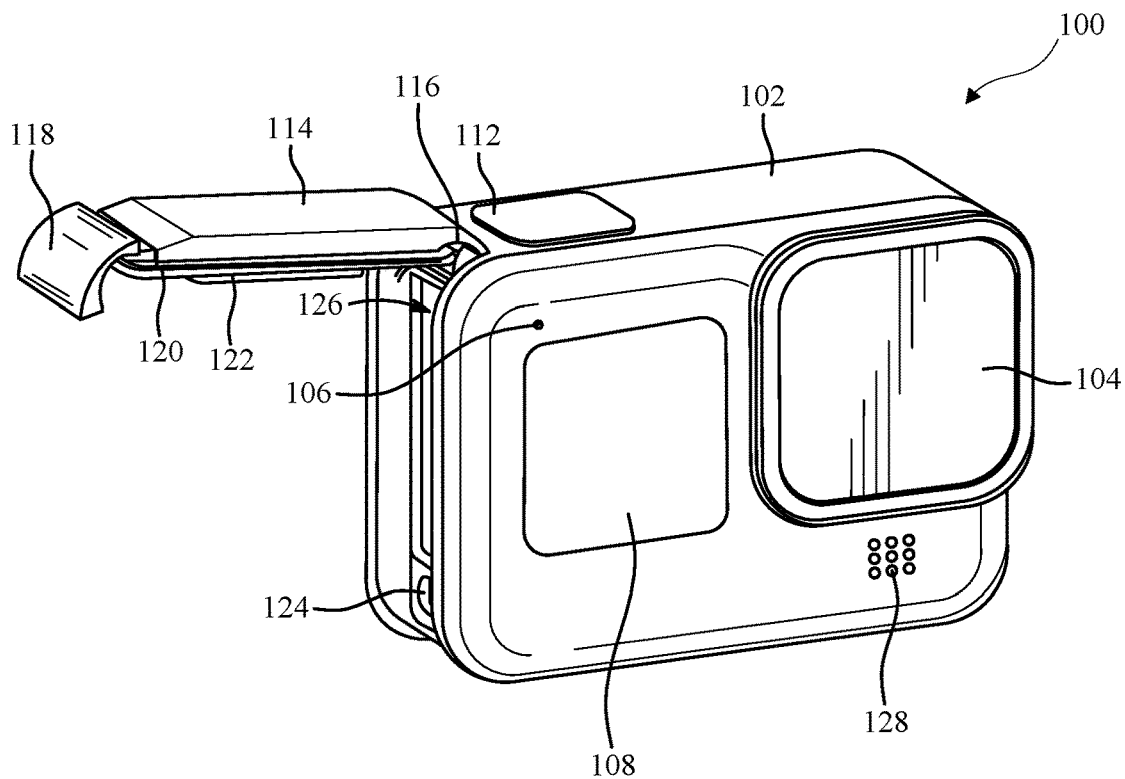
FIGS. 1A-B are isometric views of an example of an image capture device.
Figure 1B:
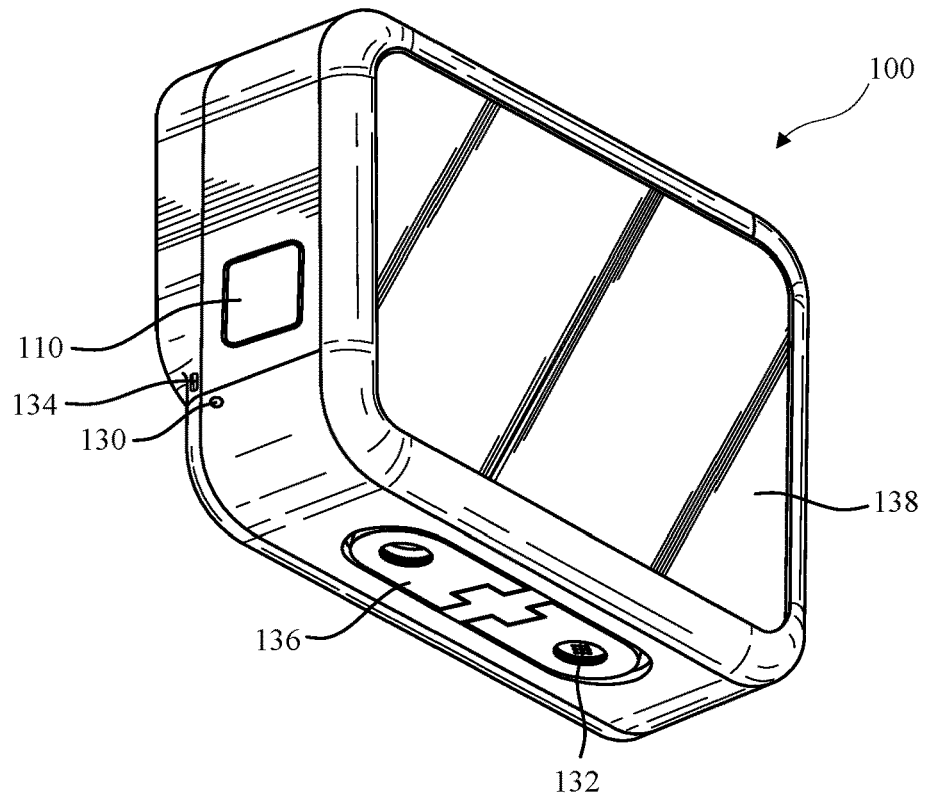

FIGS. 1A-B are isometric views of an example of an image capture device 100. The image capture device 100 may include a body 102, a lens 104 structured on a front surface of the body 102, various indicators on the front surface of the body 102 (such as light-emitting diodes (LEDs), displays, and the like), various input mechanisms (such as buttons, switches, and/or touch-screens), and electronics (such as imaging electronics, power electronics, etc.) internal to the body 102 for capturing images via the lens 104 and/or performing other functions. The lens 104 is configured to receive light incident upon the lens 104 and to direct received light onto an image sensor internal to the body 102. The image capture device 100 may be configured to capture images and video and to store captured images and video for subsequent display or playback.

The image capture device 100 may include an LED or another form of indicator 106 to indicate a status of the image capture device 100 and a liquid-crystal display (LCD) or other form of a display 108 to show status information such as battery life, camera mode, elapsed time, and the like. The image capture device 100 may also include a mode button 110 and a shutter button 112 that are configured to allow a user of the image capture device 100 to interact with the image capture device 100. For example, the mode button 110 and the shutter button 112 may be used to turn the image capture device 100 on and off, scroll through modes and settings, and select modes and change settings. The image capture device 100 may include additional buttons or interfaces (not shown) to support and/or control additional functionality.

The image capture device 100 may include a door 114 coupled to the body 102, for example, using a hinge mechanism 116. The door 114 may be secured to the body 102 using a latch mechanism 118 that releasably engages the body 102 at a position generally opposite the hinge mechanism 116. The door 114 may also include a seal 120 and a battery interface 122. When the door 114 is an open position, access is provided to an input-output (I/O) interface 124 for connecting to or communicating with external devices as described below and to a battery receptacle 126 for placement and replacement of a battery (not shown). The battery receptacle 126 includes operative connections (not shown) for power transfer between the battery and the image capture device 100. When the door 114 is in a closed position, the seal 120 engages a flange (not shown) or other interface to provide an environmental seal, and the battery interface 122 engages the battery to secure the battery in the battery receptacle 126. The door 114 can also have a removed position (not shown) where the entire door 114 is separated from the image capture device 100, that is, where both the hinge mechanism 116 and the latch mechanism 118 are decoupled from the body 102 to allow the door 114 to be removed from the image capture device 100.

The image capture device 100 may include a microphone 128 on a front surface and another microphone 130 on a side surface. The image capture device 100 may include other microphones on other surfaces (not shown). The microphones 128, 130 may be configured to receive and record audio signals in conjunction with recording video or separate from recording of video. The image capture device 100 may include a speaker 132 on a bottom surface of the image capture device 100. The image capture device 100 may include other speakers on other surfaces (not shown). The speaker 132 may be configured to play back recorded audio or emit sounds associated with notifications.

A front surface of the image capture device 100 may include a drainage channel 134. A bottom surface of the image capture device 100 may include an interconnect mechanism 136 for connecting the image capture device 100 to a handle grip or other securing device. In the example shown in FIG. 1B, the interconnect mechanism 136 includes folding protrusions configured to move between a nested or collapsed position as shown and an extended or open position (not shown) that facilitates coupling of the protrusions to mating protrusions of other devices such as handle grips, mounts, clips, or like devices.

The image capture device 100 may include an interactive display 138 that allows for interaction with the image capture device 100 while simultaneously displaying information on a surface of the image capture device 100.

The image capture device 100 of FIGS. 1A-B includes an exterior that encompasses and protects internal electronics. In the present example, the exterior includes six surfaces (i.e. a front face, a left face, a right face, a back face, a top face, and a bottom face) that form a rectangular cuboid. Furthermore, both the front and rear surfaces of the image capture device 100 are rectangular. In other embodiments, the exterior may have a different shape. The image capture device 100 may be made of a rigid material such as plastic, aluminum, steel, or fiberglass. The image capture device 100 may include features other than those described here. For example, the image capture device 100 may include additional buttons or different interface features, such as interchangeable lenses, cold shoes, and hot shoes that can add functional features to the image capture device 100.

The image capture device 100 may include various types of image sensors, such as charge-coupled device (CCD) sensors, active pixel sensors (APS), complementary metal-oxide-semiconductor (CMOS) sensors, N-type metal-oxide-semiconductor (NMOS) sensors, and/or any other image sensor or combination of image sensors.

Although not illustrated, in various embodiments, the image capture device 100 may include other additional electrical components (e.g., an image processor, camera system-on-chip (SoC), etc.), which may be included on one or more circuit boards within the body 102 of the image capture device 100.

The image capture device 100 may interface with or communicate with an external device, such as an external user interface device (not shown), via a wired or wireless computing communication link (e.g., the I/O interface 124). Any number of computing communication links may be used. The computing communication link may be a direct computing communication link or an indirect computing communication link, such as a link including another device or a network, such as the internet, may be used.

In some implementations, the computing communication link may be a Wi-Fi link, an infrared link, a Bluetooth (BT) link, a cellular link, a ZigBee link, a near field communications (NFC) link, such as an ISO/IEC 20643 protocol link, an Advanced Network Technology interoperability (ANT+) link, and/or any other wireless communications link or combination of links.

In some implementations, the computing communication link may be an HDMI link, a USB link, a digital video interface link, a display port interface link, such as a Video Electronics Standards Association (VESA) digital display interface link, an Ethernet link, a Thunderbolt link, and/or other wired computing communication link.

The image capture device 100 may transmit images, such as panoramic images, or portions thereof, to the external user interface device via the computing communication link, and the external user interface device may store, process, display, or a combination thereof the panoramic images.

The external user interface device may be a computing device, such as a smartphone, a tablet computer, a phablet, a smart watch, a portable computer, personal computing device, and/or another device or combination of devices configured to receive user input, communicate information with the image capture device 100 via the computing communication link, or receive user input and communicate information with the image capture device 100 via the computing communication link.

The external user interface device may display, or otherwise present, content, such as images or video, acquired by the image capture device 100. For example, a display of the external user interface device may be a viewport into the three-dimensional space represented by the panoramic images or video captured or created by the image capture device 100.

The external user interface device may communicate information, such as metadata, to the image capture device 100. For example, the external user interface device may send orientation information of the external user interface device with respect to a defined coordinate system to the image capture device 100, such that the image capture device 100 may determine an orientation of the external user interface device relative to the image capture device 100.

Based on the determined orientation, the image capture device 100 may identify a portion of the panoramic images or video captured by the image capture device 100 for the image capture device 100 to send to the external user interface device for presentation as the viewport. In some implementations, based on the determined orientation, the image capture device 100 may determine the location of the external user interface device and/or the dimensions for viewing of a portion of the panoramic images or video.

The external user interface device may implement or execute one or more applications to manage or control the image capture device 100. For example, the external user interface device may include an application for controlling camera configuration, video acquisition, video display, or any other configurable or controllable aspect of the image capture device 100.

The user interface device, such as via an application, may generate and share, such as via a cloud-based or social media service, one or more images, or short video clips, such as in response to user input. In some implementations, the external user interface device, such as via an application, may remotely control the image capture device 100 such as in response to user input.

The external user interface device, such as via an application, may display unprocessed or minimally processed images or video captured by the image capture device 100 contemporaneously with capturing the images or video by the image capture device 100, such as for shot framing or live preview, and which may be performed in response to user input. In some implementations, the external user interface device, such as via an application, may mark one or more key moments contemporaneously with capturing the images or video by the image capture device 100, such as with a tag or highlight in response to a user input or user gesture.

The external user interface device, such as via an application, may display or otherwise present marks or tags associated with images or video, such as in response to user input. For example, marks may be presented in a camera roll application for location review and/or playback of video highlights.

The external user interface device, such as via an application, may wirelessly control camera software, hardware, or both. For example, the external user interface device may include a web-based graphical interface accessible by a user for selecting a live or previously recorded video stream from the image capture device 100 for display on the external user interface device.

The external user interface device may receive information indicating a user setting, such as an image resolution setting (e.g., 3840 pixels by 2160 pixels), a frame rate setting (e.g., 60 frames per second (fps)), a location setting, and/or a context setting, which may indicate an activity, such as mountain biking, in response to user input, and may communicate the settings, or related information, to the image capture device 100.

Figure 4:
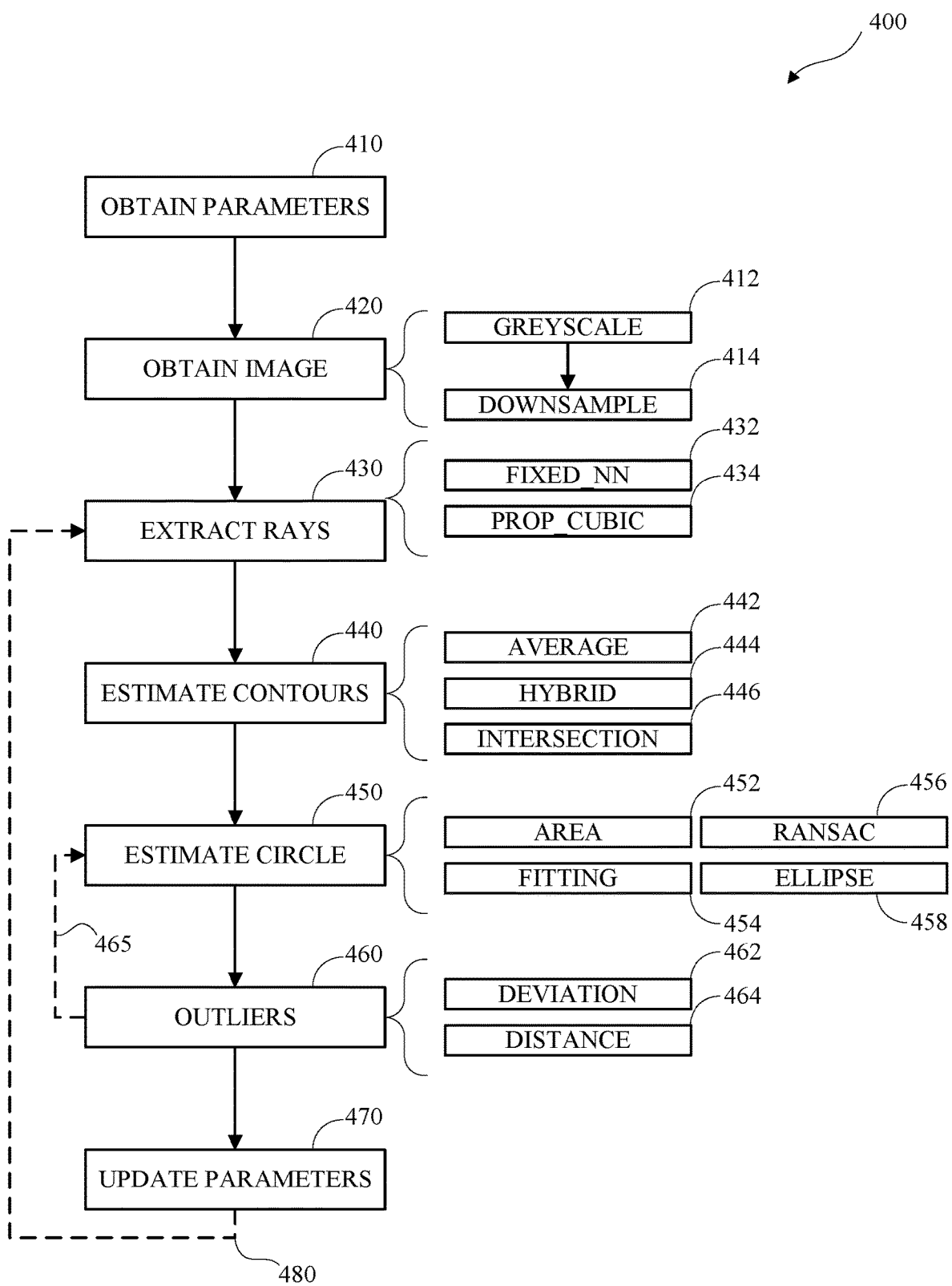
FIG. 4 is a flow diagram of an example of optical center calibration.

The image capture device 100 may be used to implement some or all of the techniques described in this disclosure, such as the technique optical center calibration 400 described in FIG. 4.

Figure 1C:
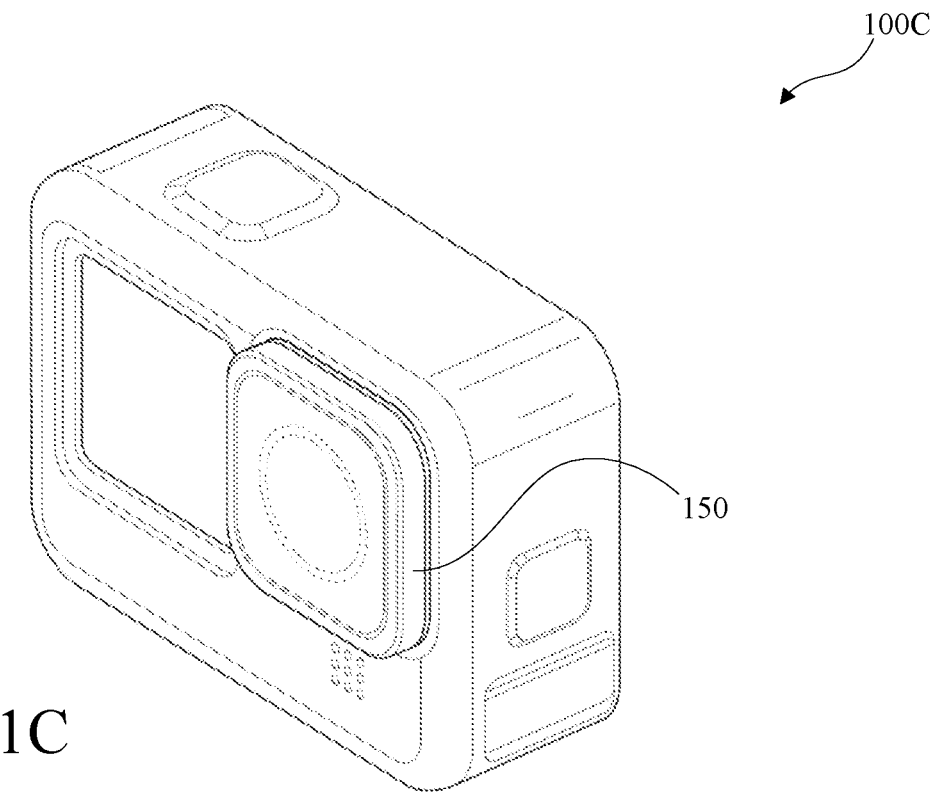
FIGS. 1C-D are isometric views of another example of an image capture device.
Figure 1D:
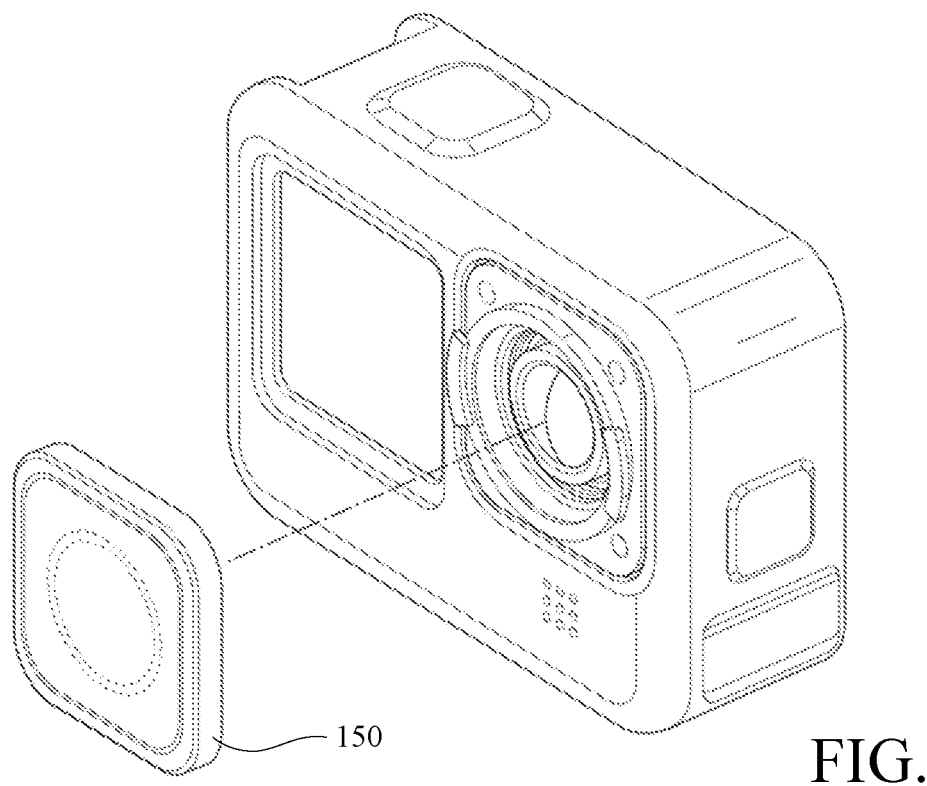

FIGS. 1C-D are isometric views of another example of an image capture device 100C. The image capture device 100C shown in FIGS. 1C-1D is similar to the image capture device 100 shown in FIGS. 1A-1B, except as is described herein or as is otherwise clear from context. For example, the image capture device 100C shown in FIGS. 1C-1D includes a replaceable outer lens group 150.

Figure 1E:
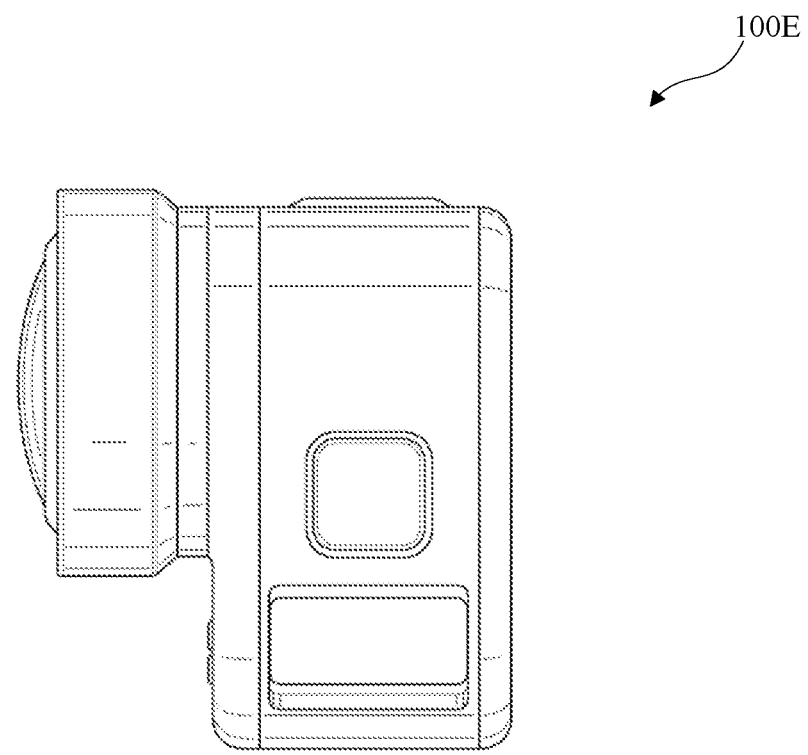
FIGS. 1E-F are isometric views of another example of an image capture device.
Figure 1F:
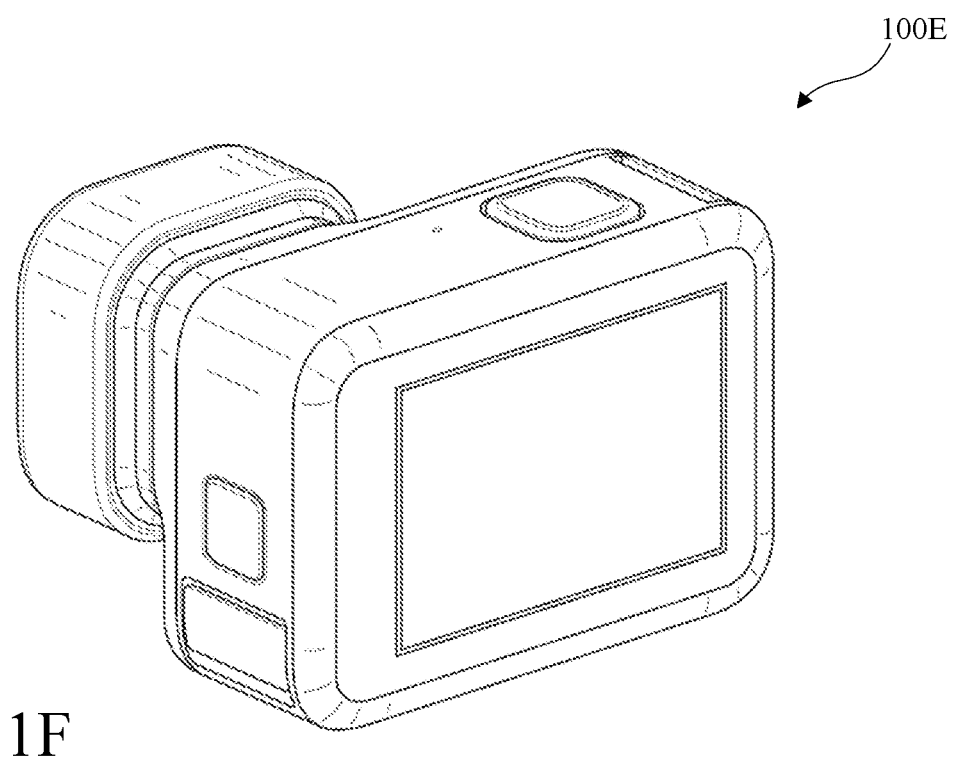

FIGS. 1E-F are isometric views of another example of an image capture device 100E. The image capture device 100E shown in FIGS. 1E-1F is similar to the image capture devices 100, 100C shown in FIGS. 1A-1D, except as is described herein or as is otherwise clear from context.

Figure 2A:
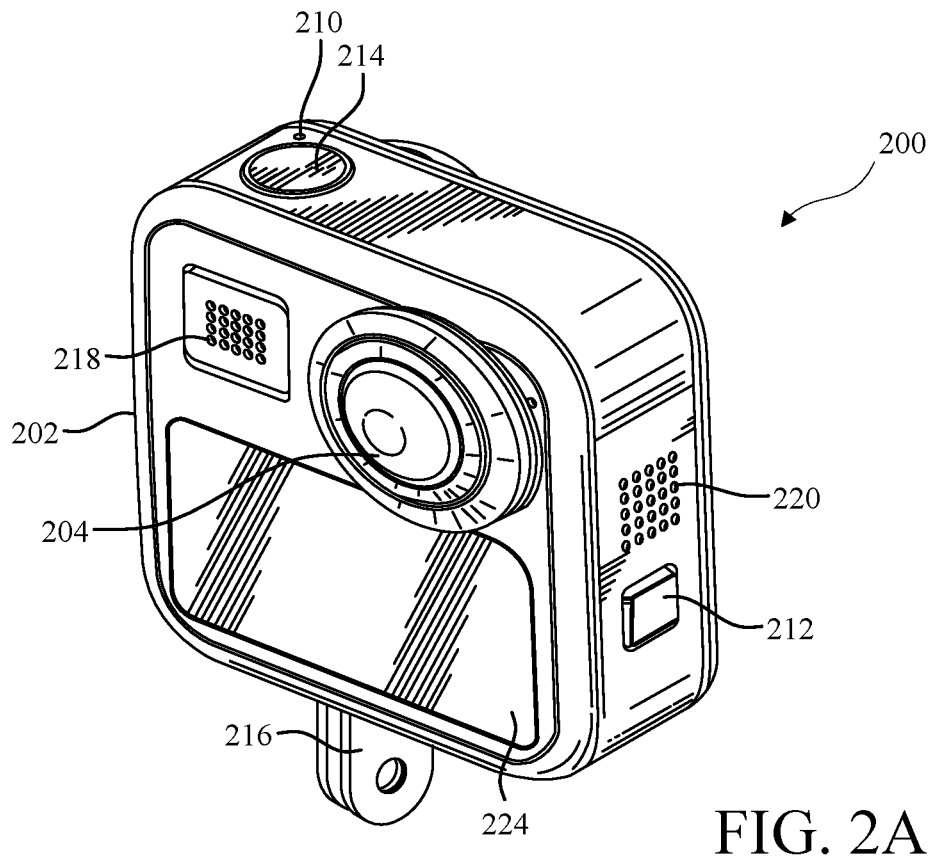
FIGS. 2A-B are isometric views of another example of an image capture device.
Figure 2B:
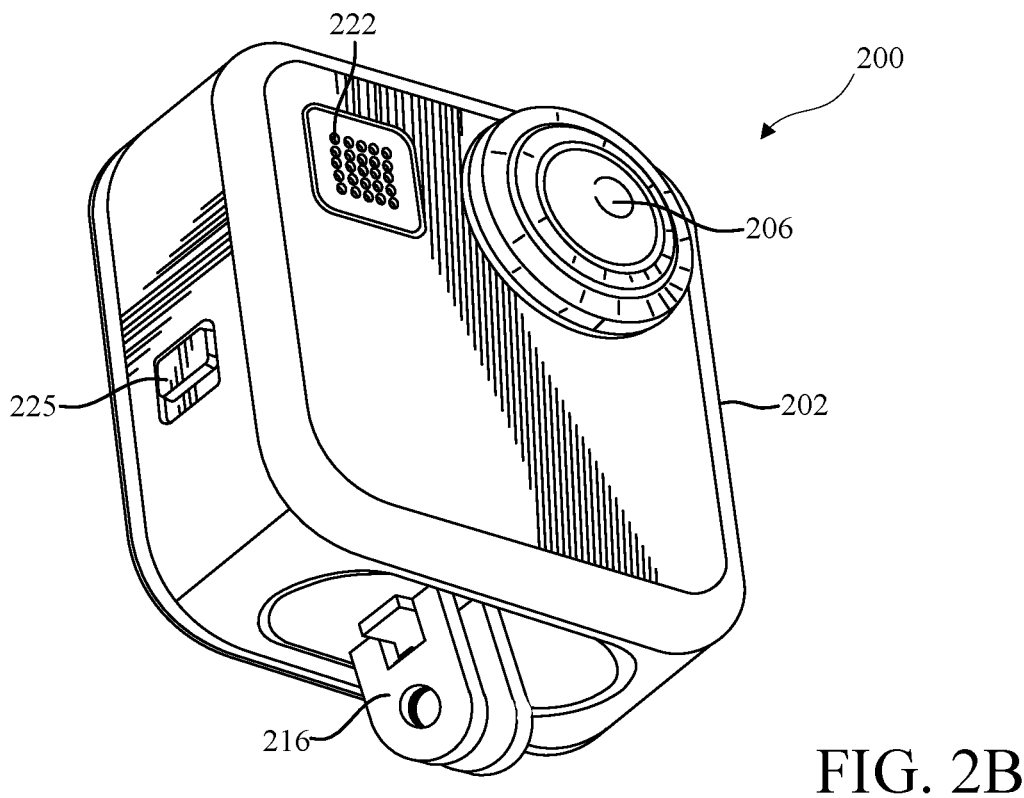

FIGS. 2A-B illustrate another example of an image capture device 200. The image capture device 200 includes a body 202 and two camera lenses 204 and 206 disposed on opposing surfaces of the body 202, for example, in a back-to-back configuration, Janus configuration, or offset Janus configuration. The body 202 of the image capture device 200 may be made of a rigid material such as plastic, aluminum, steel, or fiberglass.

The image capture device 200 includes various indicators on the front of the surface of the body 202 (such as LEDs, displays, and the like), various input mechanisms (such as buttons, switches, and touch-screen mechanisms), and electronics (e.g., imaging electronics, power electronics, etc.) internal to the body 202 that are configured to support image capture via the two camera lenses 204 and 206 and/or perform other imaging functions.

The image capture device 200 includes various indicators, for example, LEDs 208, 210 to indicate a status of the image capture device 100. The image capture device 200 may include a mode button 212 and a shutter button 214 configured to allow a user of the image capture device 200 to interact with the image capture device 200, to turn the image capture device 200 on, and to otherwise configure the operating mode of the image capture device 200. It should be appreciated, however, that, in alternate embodiments, the image capture device 200 may include additional buttons or inputs to support and/or control additional functionality.

The image capture device 200 may include an interconnect mechanism 216 for connecting the image capture device 200 to a handle grip or other securing device. In the example shown in FIGS. 2A and 2B, the interconnect mechanism 216 includes folding protrusions configured to move between a nested or collapsed position (not shown) and an extended or open position as shown that facilitates coupling of the protrusions to mating protrusions of other devices such as handle grips, mounts, clips, or like devices.

The image capture device 200 may include audio components 218, 220, 222 such as microphones configured to receive and record audio signals (e.g., voice or other audio commands) in conjunction with recording video. The audio component 218, 220, 222 can also be configured to play back audio signals or provide notifications or alerts, for example, using speakers. Placement of the audio components 218, 220, 222 may be on one or more of several surfaces of the image capture device 200. In the example of FIGS. 2A and 2B, the image capture device 200 includes three audio components 218, 220, 222, with the audio component 218 on a front surface, the audio component 220 on a side surface, and the audio component 222 on a back surface of the image capture device 200. Other numbers and configurations for the audio components are also possible.

The image capture device 200 may include an interactive display 224 that allows for interaction with the image capture device 200 while simultaneously displaying information on a surface of the image capture device 200. The interactive display 224 may include an I/O interface, receive touch inputs, display image information during video capture, and/or provide status information to a user. The status information provided by the interactive display 224 may include battery power level, memory card capacity, time elapsed for a recorded video, etc.

The image capture device 200 may include a release mechanism 225 that receives a user input to in order to change a position of a door (not shown) of the image capture device 200. The release mechanism 225 may be used to open the door (not shown) in order to access a battery, a battery receptacle, an I/O interface, a memory card interface, etc. (not shown) that are similar to components described in respect to the image capture device 100 of FIGS. 1A-1F.

In some embodiments, the image capture device 200 described herein includes features other than those described. For example, instead of the I/O interface and the interactive display 224, the image capture device 200 may include additional interfaces or different interface features. For example, the image capture device 200 may include additional buttons or different interface features, such as interchangeable lenses, cold shoes, and hot shoes that can add functional features to the image capture device 200.

Figure 2D:
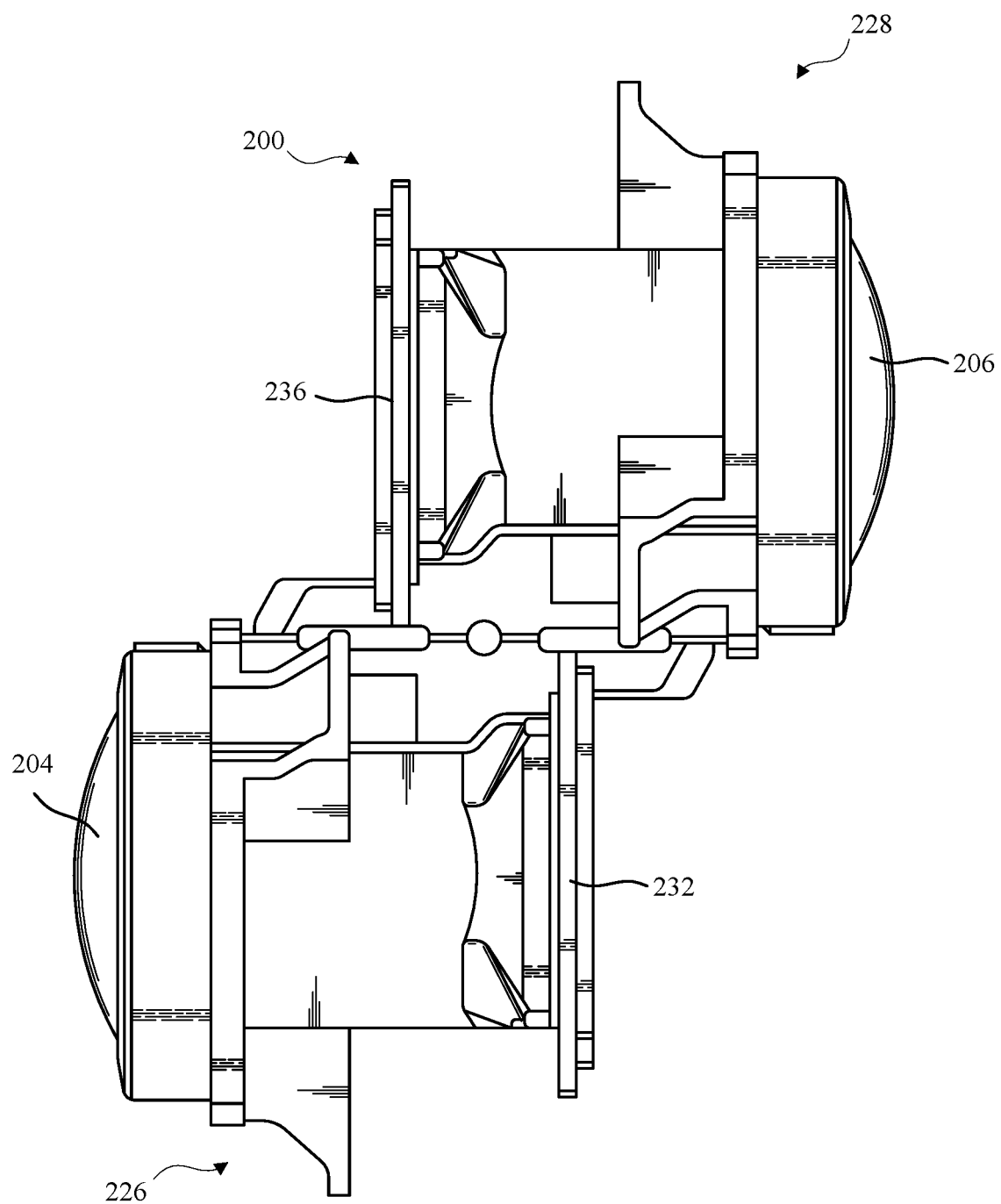
FIG. 2D is a partial cross-sectional view of the image capture device of FIG. 2C.

FIG. 2C is a top view of the image capture device 200 of FIGS. 2A-B and FIG. 2D is a partial cross-sectional view of the image capture device 200 of FIG. 2C. The image capture device 200 is configured to capture spherical images, and accordingly, includes a first image capture device 226 and a second image capture device 228. The first image capture device 226 defines a first field-of-view 230 and includes the lens 204 that receives and directs light onto a first image sensor 232. Similarly, the second image capture device 228 defines a second field-of-view 234 and includes the lens 206 that receives and directs light onto a second image sensor 236. To facilitate the capture of spherical images, the image capture devices 226 and 228 (and related components) may be arranged in a back-to-back (Janus) configuration such that the lenses 204, 206 face in generally opposite directions.

The fields-of-view 230, 234 of the lenses 204, 206 are shown above and below boundaries 238, 240 indicated in dotted line. Behind the first lens 204, the first image sensor 232 may capture a first hyper-hemispherical image plane from light entering the first lens 204, and behind the second lens 206, the second image sensor 236 may capture a second hyper-hemispherical image plane from light entering the second lens 206.

One or more areas, such as blind spots 242, 244 may be outside of the fields-of-view 230, 234 of the lenses 204, 206 so as to define a "dead zone." In the dead zone, light may be obscured from the lenses 204, 206 and the corresponding image sensors 232, 236, and content in the blind spots 242, 244 may be omitted from capture. In some implementations, the image capture devices 226, 228 may be configured to minimize the blind spots 242, 244.

The fields-of-view 230, 234 may overlap. Stitch points 246, 248 proximal to the image capture device 200, that is, locations at which the fields-of-view 230, 234 overlap, may be referred to herein as overlap points or stitch points. Content captured by the respective lenses 204, 206 that is distal to the stitch points 246, 248 may overlap.

Images contemporaneously captured by the respective image sensors 232, 236 may be combined to form a combined image. Generating a combined image may include correlating the overlapping regions captured by the respective image sensors 232, 236, aligning the captured fields-of-view 230, 234, and stitching the images together to form a cohesive combined image.

A slight change in the alignment, such as position and/or tilt, of the lenses 204, 206, the image sensors 232, 236, or both, may change the relative positions of their respective fields-of-view 230, 234 and the locations of the stitch points 246, 248. A change in alignment may affect the size of the blind spots 242, 244, which may include changing the size of the blind spots 242, 244 unequally.

Incomplete or inaccurate information indicating the alignment of the image capture devices 226, 228, such as the locations of the stitch points 246, 248, may decrease the accuracy, efficiency, or both of generating a combined image. In some implementations, the image capture device 200 may maintain information indicating the location and orientation of the lenses 204, 206 and the image sensors 232, 236 such that the fields-of-view 230, 234, the stitch points 246, 248, or both may be accurately determined; the maintained information may improve the accuracy, efficiency, or both of generating a combined image.

The lenses 204, 206 may be laterally offset from each other, may be off-center from a central axis of the image capture device 200, or may be laterally offset and off-center from the central axis. As compared to image capture devices with back-to-back lenses, such as lenses aligned along the same axis, image capture devices including laterally offset lenses may include substantially reduced thickness relative to the lengths of the lens barrels securing the lenses. For example, the overall thickness of the image capture device 200 may be close to the length of a single lens barrel as opposed to twice the length of a single lens barrel as in a back-to-back lens configuration. Reducing the lateral distance between the lenses 204, 206 may improve the overlap in the fields-of-view 230, 234. In another embodiment (not shown), the lenses 204, 206 may be aligned along a common imaging axis.

Images or frames captured by the image capture devices 226, 228 may be combined, merged, or stitched together to produce a combined image, such as a spherical or panoramic image, which may be an equirectangular planar image. In some implementations, generating a combined image may include use of techniques including noise reduction, tone mapping, white balancing, or other image correction. In some implementations, pixels along the stitch boundary may be matched accurately to minimize boundary discontinuities.

The image capture device 200 may be used to implement some or all of the techniques described in this disclosure, such as the technique optical center calibration 400 described in FIG. 4.

Figure 3:
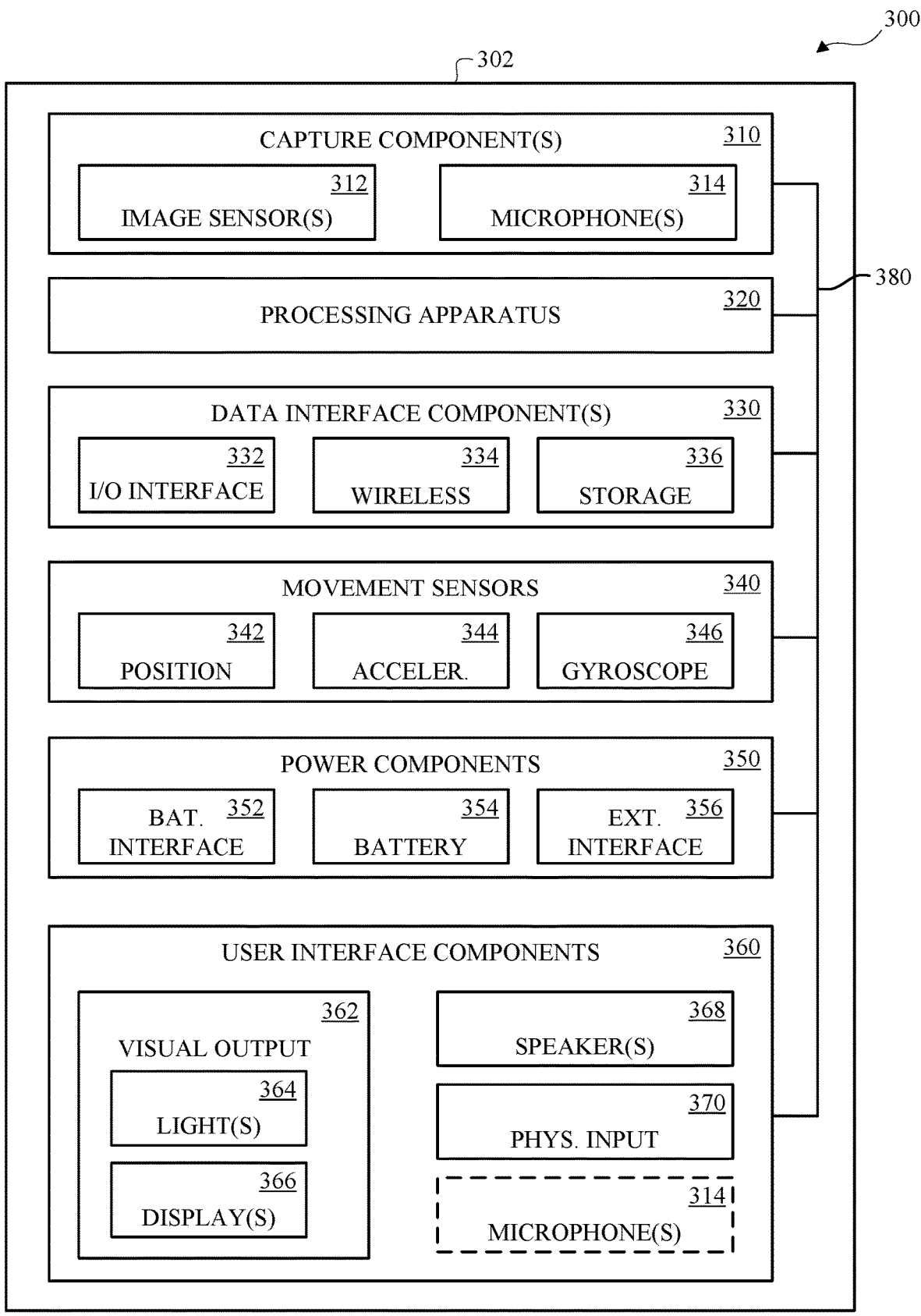
FIG. 3 is a block diagram of electronic components of an image capture device.

FIG. 3 is a block diagram of electronic components in an image capture device 300. The image capture device 300 may be a single-lens image capture device, a multi-lens image capture device, or variations thereof, including an image capture device with multiple capabilities such as use of interchangeable integrated sensor lens assemblies. The description of the image capture device 300 is also applicable to the image capture devices 100, 200 of FIGS. 1A-F and 2A-D.

The image capture device 300 includes a body 302 which includes electronic components such as capture components 310, a processing apparatus 320, data interface components 330, movement sensors 340, power components 350, and/or user interface components 360.

The capture components 310 include one or more image sensors 312 for capturing images and one or more microphones 314 for capturing audio.

The image sensor(s) 312 is configured to detect light of a certain spectrum (e.g., the visible spectrum or the infrared spectrum) and convey information constituting an image as electrical signals (e.g., analog or digital signals). The image sensor(s) 312 detects light incident through a lens coupled or connected to the body 302. The image sensor(s) 312 may be any suitable type of image sensor, such as a charge-coupled device (CCD) sensor, active pixel sensor (APS), complementary metal-oxide-semiconductor (CMOS) sensor, N-type metal-oxide-semiconductor (NMOS) sensor, and/or any other image sensor or combination of image sensors. Image signals from the image sensor(s) 312 may be passed to other electronic components of the image capture device 300 via a bus 380, such as to the processing apparatus 320. In some implementations, the image sensor(s) 312 includes a digital-to-analog converter. A multi-lens variation of the image capture device 300 can include multiple image sensors 312.

The microphone(s) 314 is configured to detect sound, which may be recorded in conjunction with capturing images to form a video. The microphone(s) 314 may also detect sound in order to receive audible commands to control the image capture device 300.

The processing apparatus 320 may be configured to perform image signal processing (e.g., filtering, tone mapping, stitching, and/or encoding) to generate output images based on image data from the image sensor(s) 312. The processing apparatus 320 may include one or more processors having single or multiple processing cores. In some implementations, the processing apparatus 320 may include an application specific integrated circuit (ASIC). For example, the processing apparatus 320 may include a custom image signal processor. The processing apparatus 320 may exchange data (e.g., image data) with other components of the image capture device 300, such as the image sensor(s) 312, via the bus 380.

The processing apparatus 320 may include memory, such as a random-access memory (RAM) device, flash memory, or another suitable type of storage device, such as a non-transitory computer-readable memory. The memory of the processing apparatus 320 may include executable instructions and data that can be accessed by one or more processors of the processing apparatus 320. For example, the processing apparatus 320 may include one or more dynamic random-access memory (DRAM) modules, such as double data rate synchronous dynamic random-access memory (DDR SDRAM). In some implementations, the processing apparatus 320 may include a digital signal processor (DSP). More than one processing apparatus may also be present or associated with the image capture device 300.

The data interface components 330 enable communication between the image capture device 300 and other electronic devices, such as a remote control, a smartphone, a tablet computer, a laptop computer, a desktop computer, or a storage device. For example, the data interface components 330 may be used to receive commands to operate the image capture device 300, transfer image data to other electronic devices, and/or transfer other signals or information to and from the image capture device 300. The data interface components 330 may be configured for wired and/or wireless communication. For example, the data interface components 330 may include an I/O interface 332 that provides wired communication for the image capture device, which may be a USB interface (e.g., USB type-C), a high-definition multimedia interface (HDMI), or a FireWire interface. The data interface components 330 may include a wireless data interface 334 that provides wireless communication for the image capture device 300, such as a Bluetooth interface, a ZigBee interface, and/or a Wi-Fi interface. The data interface components 330 may include a storage interface 336, such as a memory card slot configured to receive and operatively couple to a storage device (e.g., a memory card) for data transfer with the image capture device 300 (e.g., for storing captured images and/or recorded audio and video).

The movement sensors 340 may detect the position and movement of the image capture device 300. The movement sensors 340 may include a position sensor 342, an accelerometer 344, or a gyroscope 346. The position sensor 342, such as a global positioning system (GPS) sensor, is used to determine a position of the image capture device 300. The accelerometer 344, such as a three-axis accelerometer, measures linear motion (e.g., linear acceleration) of the image capture device 300. The gyroscope 346, such as a three-axis gyroscope, measures rotational motion (e.g., rate of rotation) of the image capture device 300. Other types of movement sensors 340 may also be present or associated with the image capture device 300.

The power components 350 may receive, store, and/or provide power for operating the image capture device 300. The power components 350 may include a battery interface 352 and a battery 354. The battery interface 352 operatively couples to the battery 354, for example, with conductive contacts to transfer power from the battery 354 to the other electronic components of the image capture device 300. The power components 350 may also include an external interface 356, and the power components 350 may, via the external interface 356, receive power from an external source, such as a wall plug or external battery, for operating the image capture device 300 and/or charging the battery 354 of the image capture device 300. In some implementations, the external interface 356 may be the I/O interface 332. In such an implementation, the I/O interface 332 may enable the power components 350 to receive power from an external source over a wired data interface component (e.g., a USB type-C cable).

The user interface components 360 may allow the user to interact with the image capture device 300, for example, providing outputs to the user and receiving inputs from the user. The user interface components 360 may include visual output components 362 to visually communicate information and/or present captured images to the user. The visual output components 362 may include one or more lights 364 and/or more displays 366. The display(s) 366 may be configured as a touch screen that receives inputs from the user. The user interface components 360 may also include one or more speakers 368. The speaker(s) 368 can function as an audio output component that audibly communicates information and/or presents recorded audio to the user. The user interface components 360 may also include one or more physical input interfaces 370 that are physically manipulated by the user to provide input to the image capture device 300. The physical input interfaces 370 may, for example, be configured as buttons, toggles, or switches. The user interface components 360 may also be considered to include the microphone(s) 314, as indicated in dotted line, and the microphone(s) 314 may function to receive audio inputs from the user, such as voice commands.

The image capture device 300 may be used to implement some or all of the techniques described in this disclosure, such as the technique optical center calibration 400 described in FIG. 4.

An image capture device, such as the image capture device 100 shown in FIG. 1, the image capture device 200 shown in FIG. 2, or the image capture device 300 shown in FIG. 3, may be designed and manufactured such that an optical center of a lens, such as the lens 104 shown in FIG. 1 or the lenses 204, 206 shown in FIG. 2, of the image capture device is aligned (expected alignment) with a center of an image sensor, such as the image sensors 232, 236 shown in FIG. 2 or the image sensors 312 shown in FIG. 3, of the image capture device. Factors, such as manufacturing variances, materials variances, physical force, temperature variances, materials aging, and the like, may cause or contribute to variances of the alignment or orientation of the optical center of the lens with respect to the center of the image sensor (misalignment). Uncalibrated, or unidentified, misalignment, such as an uncalibrated alignment difference of a number, or cardinality, of pixels, such as thirty (30) pixels, greater than a defined threshold, such as five (5) pixels, may reduce the accuracy, efficiency, or both of signal processing, such as for image or video stabilization. Other lens calibration alignment thresholds may be used. For example, a sub-pixel lens calibration alignment threshold may be used. To improve the accuracy, efficiency, or both, of the image capture apparatus, the alignment or orientation of the optical center of the lens with respect to the center of the image sensor may be calibrated (optical center calibration), such as automatically, which may include determining the optical center of the lens. Optical center calibration may include one or more sub-elements. One or more implementations of respective sub-elements are described herein. Optical center calibration may include respective combinations of the implementations of the respective sub-elements as described herein.

FIG. 4 is a flow diagram of an example of optical center calibration 400. Optical center calibration 400 may be implemented in an image capture device, such as the image capture device 100 shown in FIG. 1, the image capture device 200 shown in FIG. 2, or the image capture device 300 shown in FIG. 3, including a lens, such as the lens 104 shown in FIG. 1 or the lenses 204, 206 shown in FIG. 2, and an image sensor, such as the image sensors 232, 236 shown in FIG. 2 or the image sensors 312 shown in FIG. 3. In some implementations, one or more aspects of optical center calibration 400 for an image capture device may be implemented in an external device, such as an external computer.

Optical center calibration 400 includes calibrating the image capture device, which includes estimating a calibration circle for obtaining the optical center of the lens of the image capture device. Optical center calibration 400 includes estimating the calibration circle using an image captured by the image capture device using the lens. Optical center calibration 400 includes determining the orientation, or alignment, of the optical center of the lens with respect to the image sensor of the image capture device. Estimating the calibration circle may include determining an approximation of the circle over contours estimated over extracted rays.

As shown in FIG. 4, optical center calibration 400 includes obtaining parameters at 410, obtaining an image at 420, extracting rays at 430, estimating contours at 440, estimating the calibration circle at 450, omitting outliers at 460, and updating parameters at 470.

As shown at 480, extracting rays at 430, estimating contours at 440, estimating the calibration circle at 450, omitting outliers at 460, and updating parameters at 470 may be iterated for one or more iterations, wherein a respective iteration may refine or improve the estimation of the center of the calibration circle relative to a preceding iteration, which may improve the accuracy of the calibration relative to the preceding iteration. For an iteration wherein a previously identified center of the calibration circle is unavailable, such as a first or initial iteration, optical center calibration 400 may be initialized using a center of the image. For an iteration wherein a previously identified center of the calibration circle is available, such as an iteration subsequent to a first or initial iteration, optical center calibration 400 may be initialized using the previously identified center of the calibration circle. The number, or cardinality, of iterations may be a defied value, such as two, corresponding to an expected alignment difference of five pixels or less, or may be determined dynamically, such as based on the alignment difference or the inter-iteration improvement of alignment difference.

One or more parameters may be obtained at 410. The parameters may include a radius increment (radius_increment). The parameters may include a ray segment half-size (ray_segment_halfsize). The parameters may include a number, or cardinality, of rays (num_rays), which may indicate number, or cardinality, of rays to extract from an image. The parameters may include a minimum ray length (min_ray_length), which may indicate a minimal length of a ray, over which a contour may be estimated. The parameters may include a number, or cardinality, of circle estimations (num_circle_estimations), which may indicate a number, or cardinality, of iterations.

Figure 5:
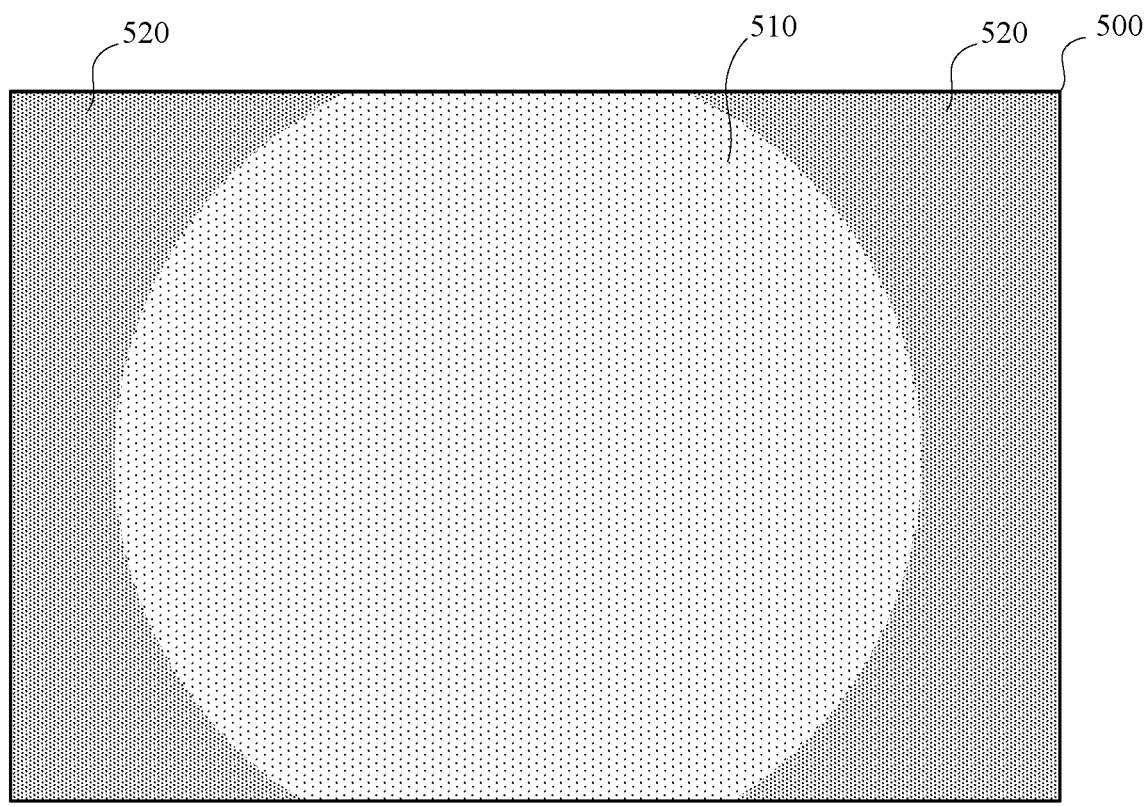
FIG. 5 is a diagram of an example representing an image captured by the image capture device using the lens.

An image may be obtained at 420. Obtaining the image at 420 may include obtaining an image (input image) captured by the image capture device using the lens. An example representing an image captured by the image capture device using the lens is shown in FIG. 5.

Obtaining the image at 420 may include obtaining a greyscale input image at 412. For example, the input image may be a raw Bayer format image, which may be a color image, and obtaining the greyscale input image may include converting the input image to obtain the greyscale input image. One or more implementations of the sub-element of obtaining the greyscale input image may include using green averaging. One or more implementations of the sub-element of obtaining the greyscale input image may include using an OpenCV cvtColor( ) function with parameter COLOR_RGB2GRAY.

Obtaining the image at 420 may include obtaining a downsampled input image at 414. The downsampled input image may be obtained using the input image or the greyscale input image. Obtaining the downsampled input image may include downsampling by a defined downsampling factor (downsample_factor) for an X dimension, Y dimension, or for the X dimension and the Y dimension. One or more implementations of the sub-element of obtaining the downsampled input image may include using an OpenCV resize( ) function with parameter INTER AREA. Downscaling the image may improve the speed of optical center calibration 400, such as by reducing the number, or cardinality, of pixels. Downscaling the image may improve the accuracy, efficiency, or both, of optical center calibration 400, such as by reducing noise by averaging pixel values.

Although not shown separately in FIG. 4, optical center calibration 400 may include initialization, which may include an initialization of the circle to detection, the center (c) may be set to the middle pixel of the input image, and the radius may be set to half of the vertical dimension multiplied by a radius initialization factor corresponding to the image capture device, the lens, or the combination thereof. For example, the radius initialization factor may be 1.015 for a first image capture device and lens and may be 1.04 for a second image capture device and lens. Initialization may include identifying a ray segment size parameter (ray_segment_size) value as a proportion of the radius, such as 16% of the radius.

Figure 6A:
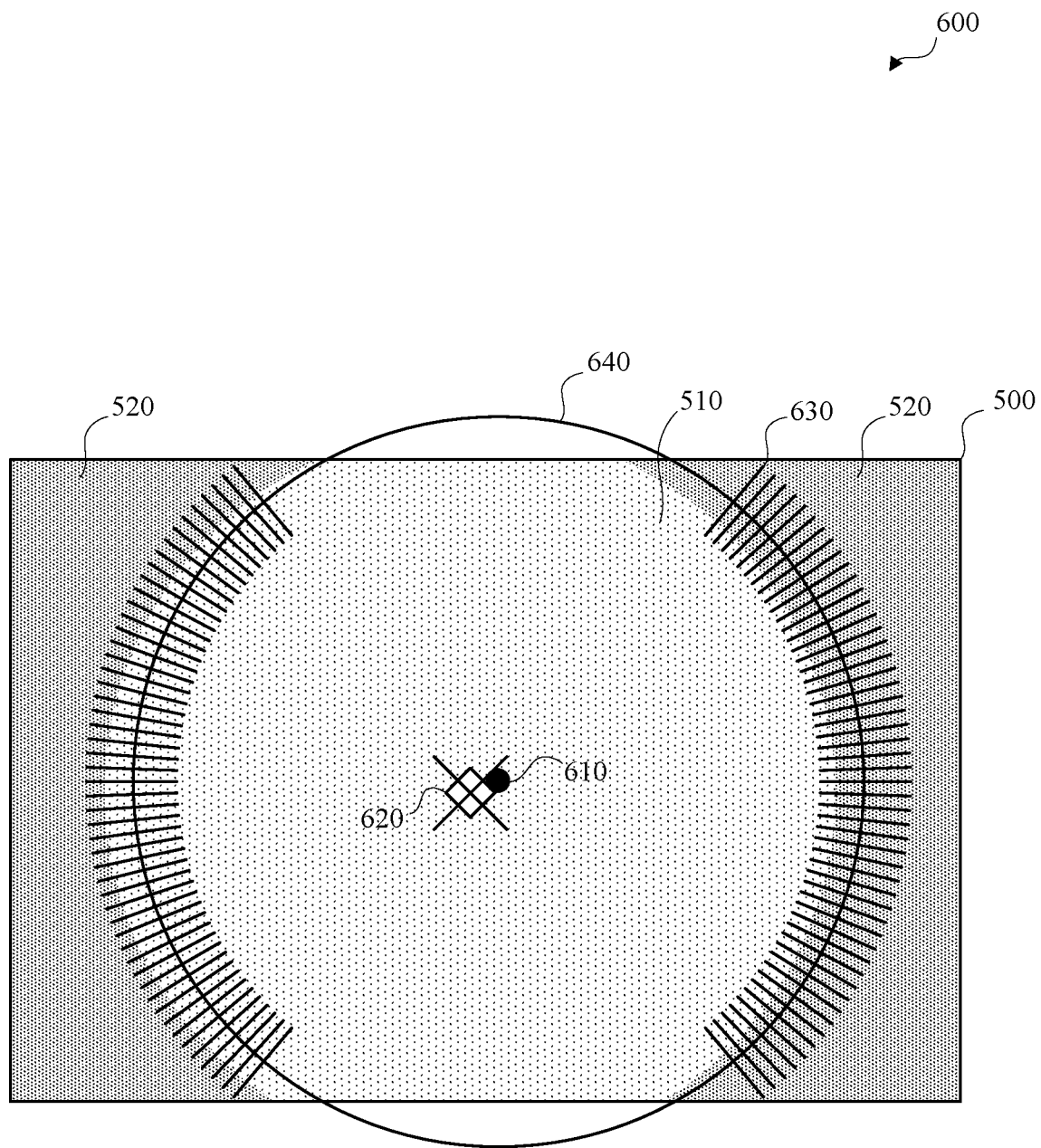
FIGS. 6A-B are diagrams of examples of ray extraction.
Figure 6B:
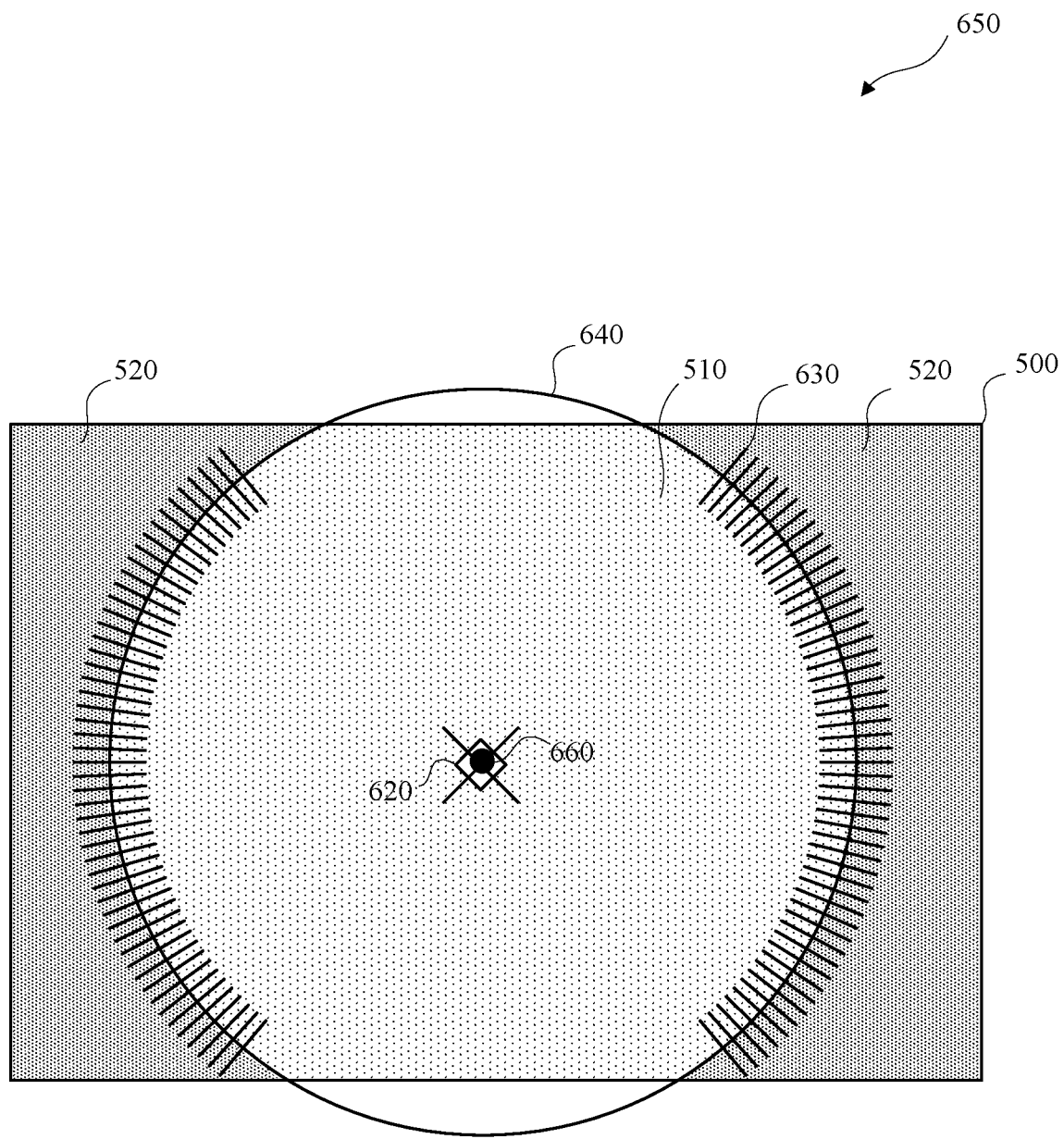

Rays, or ray segments, may be extracted at 430. Ray extraction may include obtaining image intensities over a radial segment. Ray extraction may include using the greyscale input image, the center of the calibration circle, an angle of a ray, a minimal radius for the extremities of the segment, a maximal radius for the extremities of the segment, and an averaging size in the radial direction. Examples diagrams for ray extraction are shown in FIGS. 6A-B.

Ray extraction may include spatial averaging along the circle direction for respective extracted points, which may reduce possible image noise and improve the robustness of the algorithm.

One or more implementations of the sub-element of spatial averaging may include using a fixed averaging distance and nearest neighbor interpolation at 432. One or more implementations of the sub-element of spatial averaging may include using a pixel averaging distance proportional to radius and bi-cubic interpolation at 434. The implementations of the sub-element of spatial averaging used may be identified in accordance with a defined parameter, such as an initialization parameter. The processor utilization of the implementations of the sub-element of spatial averaging using nearest neighbor interpolation may be lower than the processor utilization of the implementations of the sub-element of spatial averaging using bi-cubic interpolation.

For a respective radius between the minimal and maximal radius, an averaged intensity for pixels at the same distance from the center and with a polar angle that varies around the current polar angle may be obtained. The implementations of the sub-element of spatial averaging may include using nearest neighbor interpolation may include using angle variations of (1/radius) in radian unit, so that the angular distance between the points is 1 pixel. The implementations of the sub-element of spatial averaging using bi-cubic interpolation may include using angle variations of 0.5 degrees.

Contours, or contour positions, may be obtained at 440. The contours may be obtained based on the rays, or ray segments, extracted at 430. Contour estimation may be performed at 440 for one or more of the ray segments extracted at 430. The contour indicates the transition between image content (content pixels) captured by the input image and non-content image data (non-content pixels) included in the image. The non-content pixels include image data that includes dark, such as black or near black, pixels. The non-content pixels may include optical noise from the image capture device. In some embodiments, the non-content pixels may include image capture artifacts, such as lens flare, such that some non-content pixels may have high intensity values relative to other non-content pixels. Distinguishing content pixels from non-content pixels is non-trivial.

Figure 7:
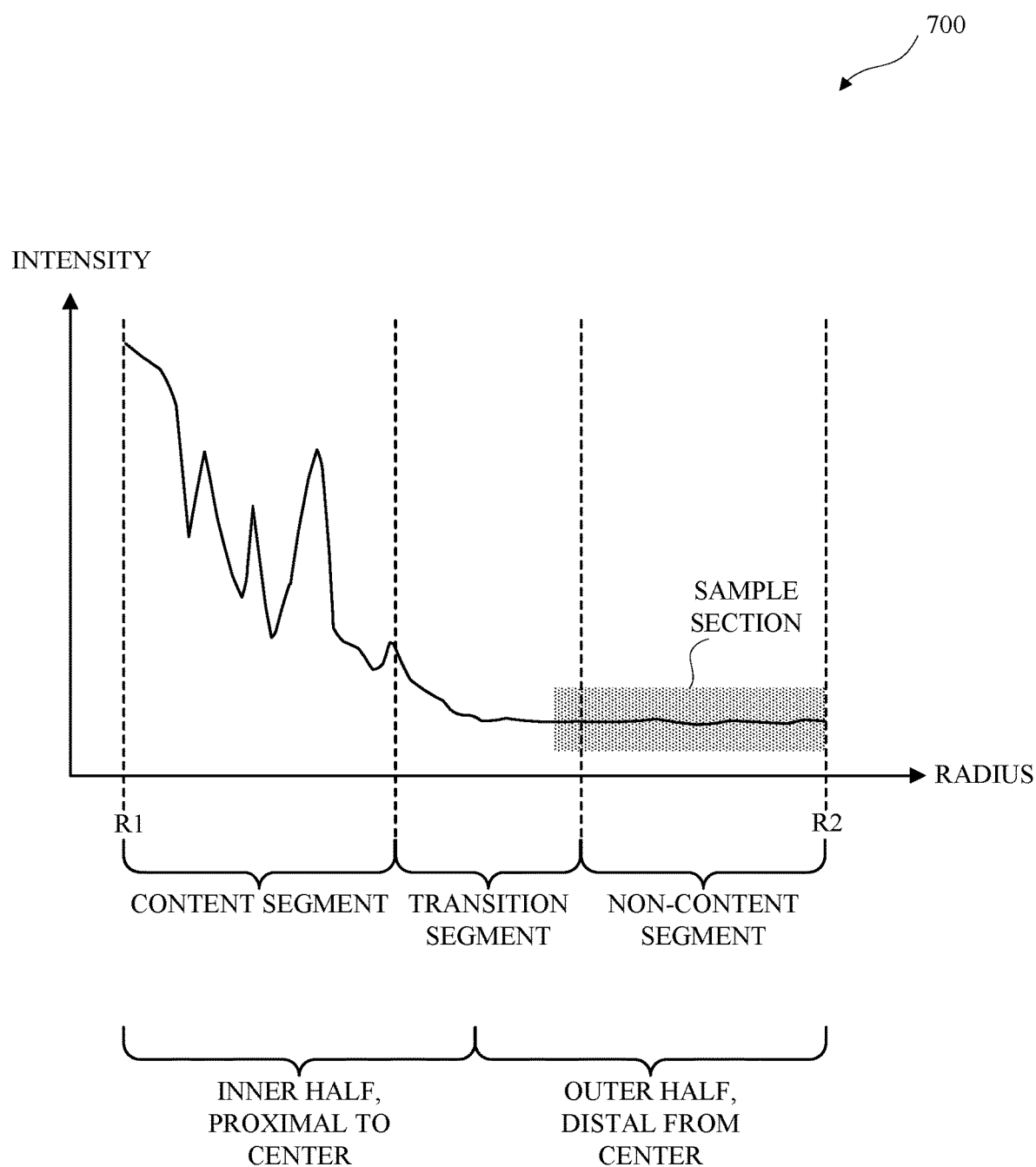
FIG. 7 is a diagram showing an example representing the content segment, the non-content segment, and the transition segment.

The image data, or pixel data, along a ray segment may be identified as including a content segment proximal to the center, a non-content segment distal from the center, and a transition segment between the content segment and the non-content segment. A diagram showing an example representing the content segment, the non-content segment, and the transition segment is shown in FIG. 7.

The content segment, the transition segment, and the non-content segment may be identified based on pixel intensity values of the corresponding pixel data. The content segment pixels may have high intensity values, variance, or both, on average, relative to the non-content segment. The non-content segment pixels may have low intensity values, variance, or both, on average, relative to the content segment. The transition segment, between the content segment and the non-content segment, may include the calibration circle. Obtaining the contours may include determining the content segment, the transition segment, and the non-content segment for respective rays. Obtaining the contours may include determining or estimating the position of the calibration circle, or contour, in the transition segment.

One or more implementations of the sub-element of obtaining contours may include using averaging based on sliding average values (averaging) at 442. The implementations of the sub-element of obtaining contours that include averaging may include determining one or more statistical values over a sample section of the respective ray, which may correspond to the end of the ray, such as the mean and standard deviation. A large portion of the outer half (distal from the center) of the ray may include non-content pixels, or a substantial majority thereof. The non-content pixels identified from the sample section of the outer half of the ray, may be used to estimate the black point and the noise of the image. The number, or cardinality, of samples for obtaining the sample section may be determined based on a 'samples' parameter value, which may correspond with the magnitude, or length, of the corresponding ray. The number, or cardinality, of samples may be determined to be small enough to contain non-content pixels and omit content pixels, but large enough to obtain accurate statistics. A diagram showing an example representing the sample section is shown in FIG. 7.

Figure 8:
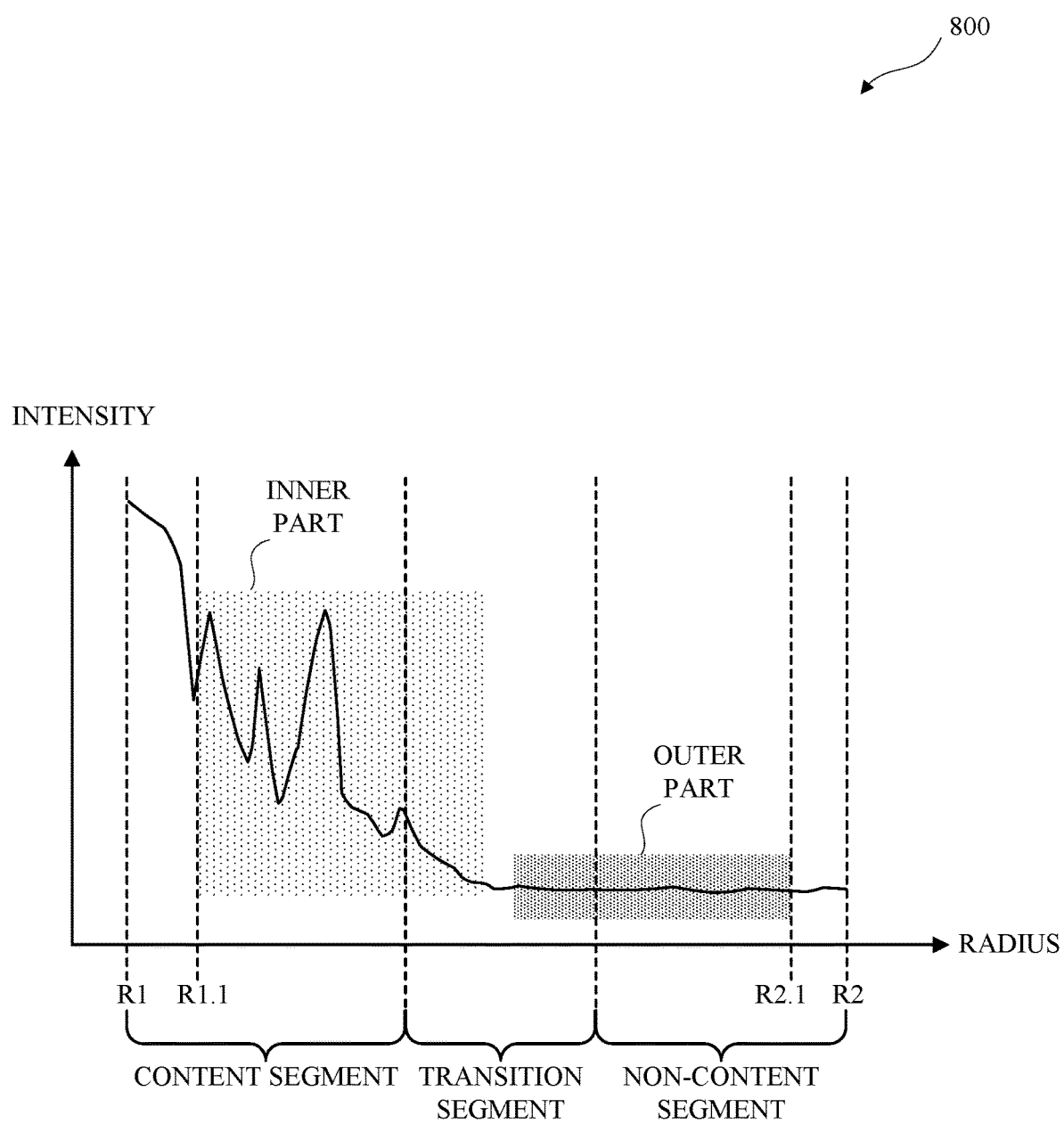
FIG. 8 is a diagram showing an example of a sliding window iteration.

Subsequent to identifying the samples, an iteration over sliding windows of 'samples' size may be performed on both sides of the ray until the minimal value of the inner part is no longer superior to the maximal value of the outer part. If the mean of the inner part is lower than the mean of the outer part, further used assumptions may not be valid, and the ray may be omitted from further use. A diagram showing an example of a sliding window iteration is shown in FIG. 8.

Figure 9:
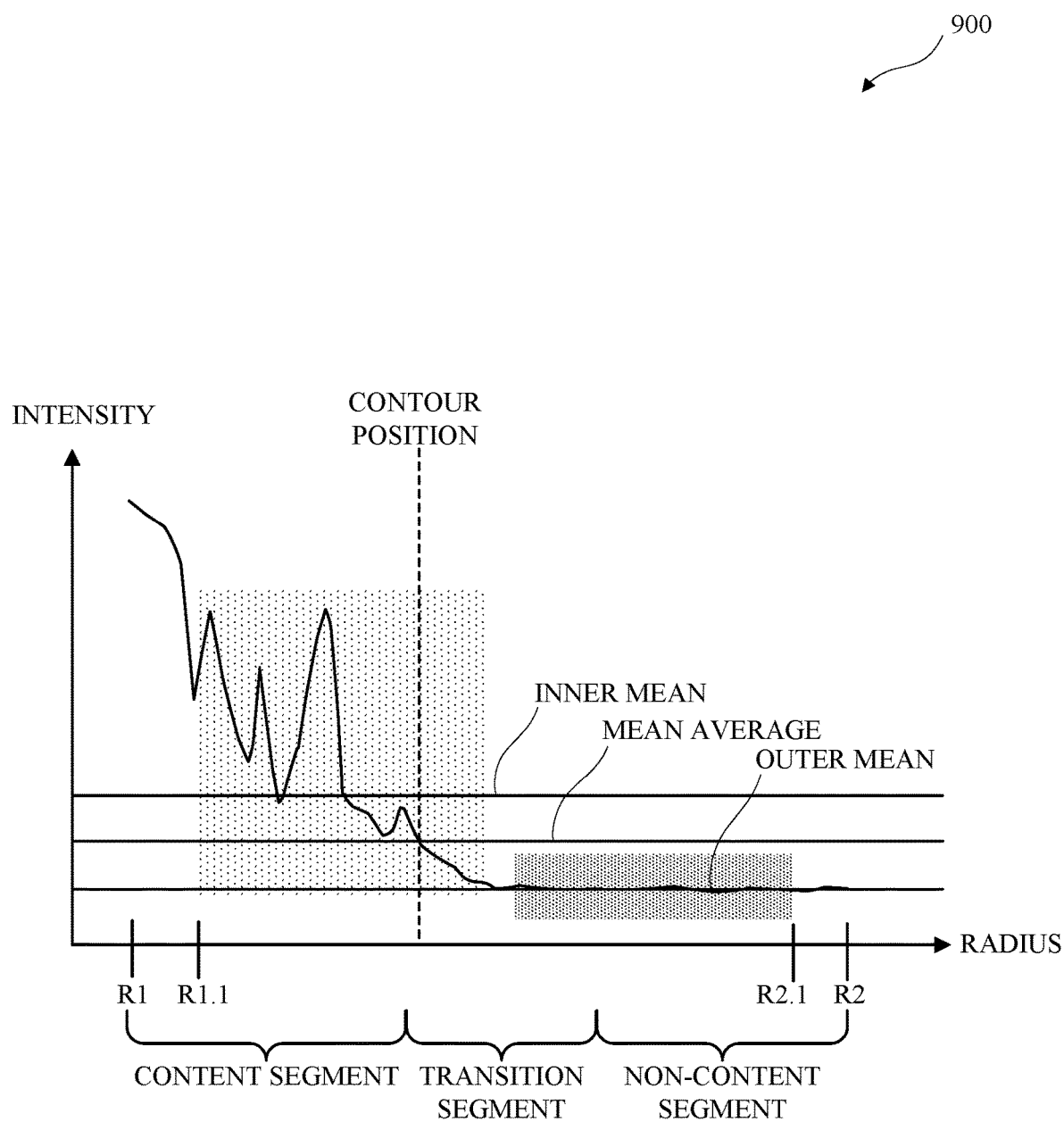
FIG. 9 is a diagram showing an example of estimating the contour.

Subsequently, a position of the contour, corresponding to the calibration circle, may be estimated. Estimating the position of the contour may include determining the statistical mean over the samples from the inner part (inner mean), determining the statistical mean over the samples from the outer part (outer mean), and obtaining the radius position where the ray value is equal to the average of those inner mean and the outer mean. A diagram showing an example of estimating the contour is shown in FIG. 9.

Obtaining the radius position may include searching from inner to outer. The profile of the contour area may be smooth, such as within a defined noise limit. The searching area may be strictly decreasing (or increasing when scanned from left to right).

The implementations of the sub-element of obtaining contours that include averaging may be robust, being based on an average value. The implementations of the sub-element of obtaining contours that include averaging may depend on postulate over the profile. The implementations of the sub-element of obtaining contours that include averaging may identify an integer result, corresponding to an index of an array.

One or more implementations of the sub-element of obtaining contours may include using a hybrid method that uses the sliding position of the average method and linear approximation of contour area and outside pixels at 444.

Figure 10:
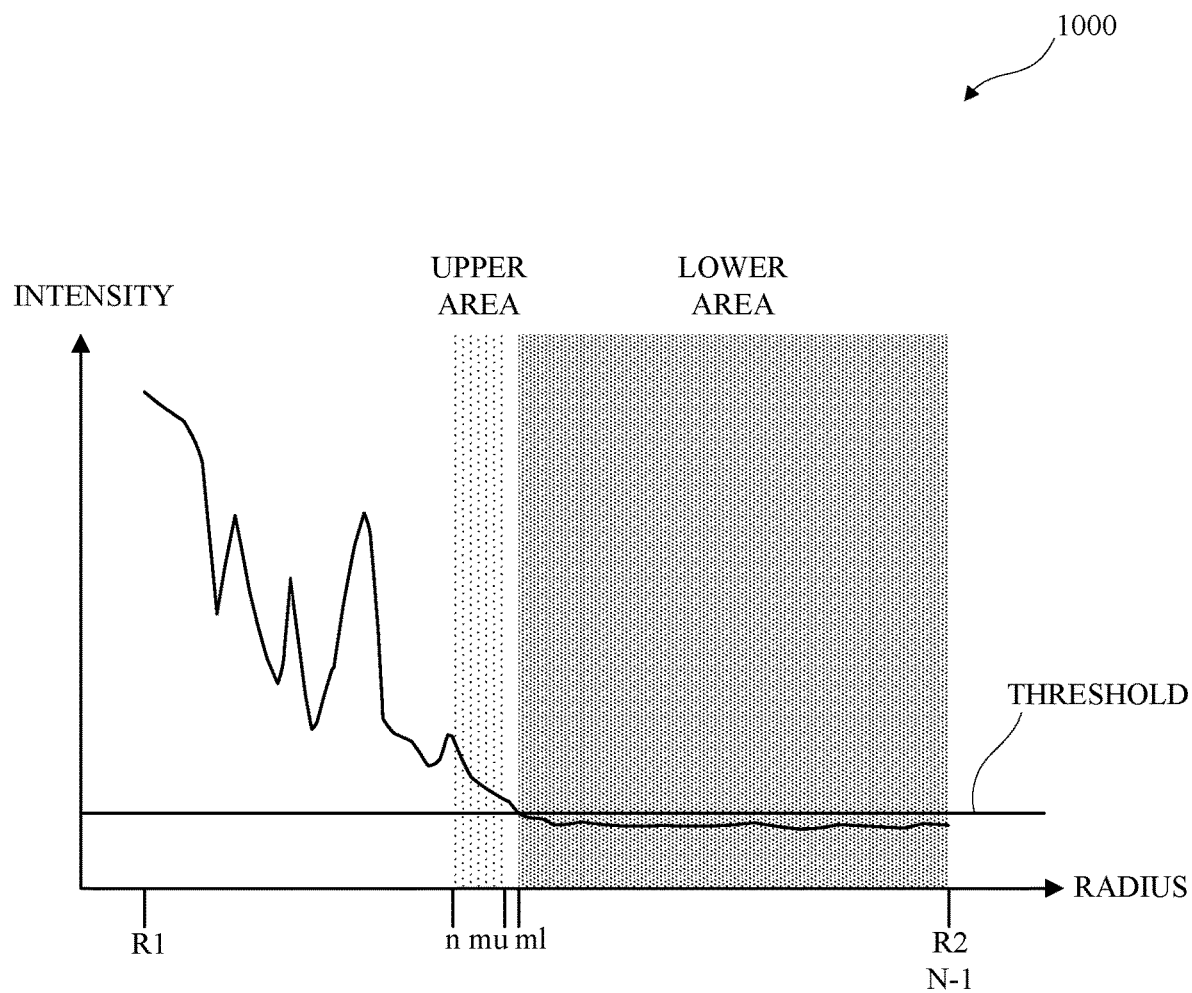
FIG. 10 is a diagram showing an example of a threshold.

The implementations of the sub-element of obtaining contours that include the hybrid method may include iterating over both (inner part and outer part) samples until the minimal value of the inner part is no longer greater than the maximal value of the outer part, which may be similar to the implementations of the sub-element of obtaining contours that include averaging. If the mean of the inner part is lower than the mean of the outer part, further used assumptions may not be valid, and the ray may be omitted from further use. Based on statistics, such as the mean and standard deviation, over the outer part, a threshold is determined in order to isolate non-content pixels. A diagram showing an example of the threshold is shown in FIG. 10.

In some implementations, $\mu_r$ may indicate the mean of the outer part, $\sigma_r$ may indicate the standard deviation of the outer part, $r[N-1]$ may indicate the last value of the ray, and obtaining the threshold may be expressed as the following:

$$\tau = \max(\mu_r + 3\sigma_r, r[N-1] + 3\sigma_r).$$

The maximum (max) may be taken in order to handle cases where the last value of the ray is high, such as corresponding to flare, noise, or the like.

Subsequent to obtaining the threshold, three indexes (n, mu, and ml) may be identified, which may designate two areas, including an upper area, where the ray values are above the threshold and strictly decreasing (inside [n, mu]), and a lower area, where the ray values are below the threshold (inside [ml, N−1]). A diagram showing an example of identifying the upper and lower areas is shown in FIG. 10.

The upper area may include content pixels, which may be inside of the image circle. The lower area may include non-content pixels.

Figure 11:
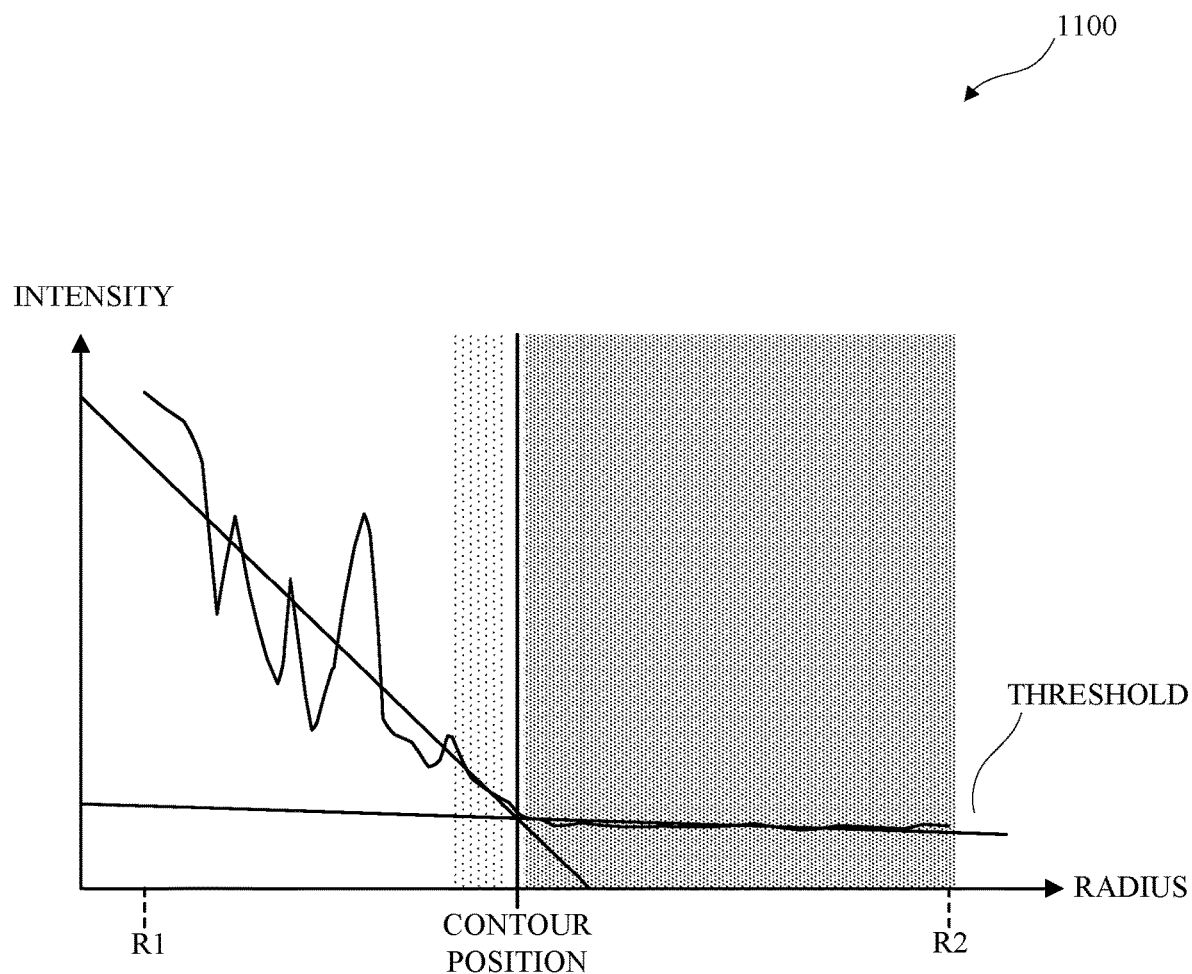
FIG. 11 is a diagram showing an example of identifying the contour position using the slope.

Subsequent to identifying the upper and lower areas, the circle contour position may be identified at the intersection of upper and lower areas. A slope for the upper area may be approximated by linear interpolation. A slope for the lower area may be approximated by linear interpolation. The contour position may be defined as the intersection of the upper area slope and the lower area slope. The contour position may be identified as a floating-point value. The contour position may be based on linear interpolation. The contour position may depend on a postulate over the profile. A diagram showing an example of identifying the contour position using the slope is shown in FIG. 11.

One or more implementations of the sub-element of obtaining contours may include using an intersection method which is an extension of the hybrid method and based on linear approximation intersection at 446.

The implementations of the sub-element of obtaining contours that include the linear approximation intersection may be similar to the implementations of the sub-element of obtaining contours that include the hybrid method, except as is described herein or as is otherwise clear from context. For example, the implementations of the sub-element of obtaining contours that include the linear approximation intersection may use an intersection between a linear representation of the non-content pixels and a linear representation of border pixels.

Figure 12:
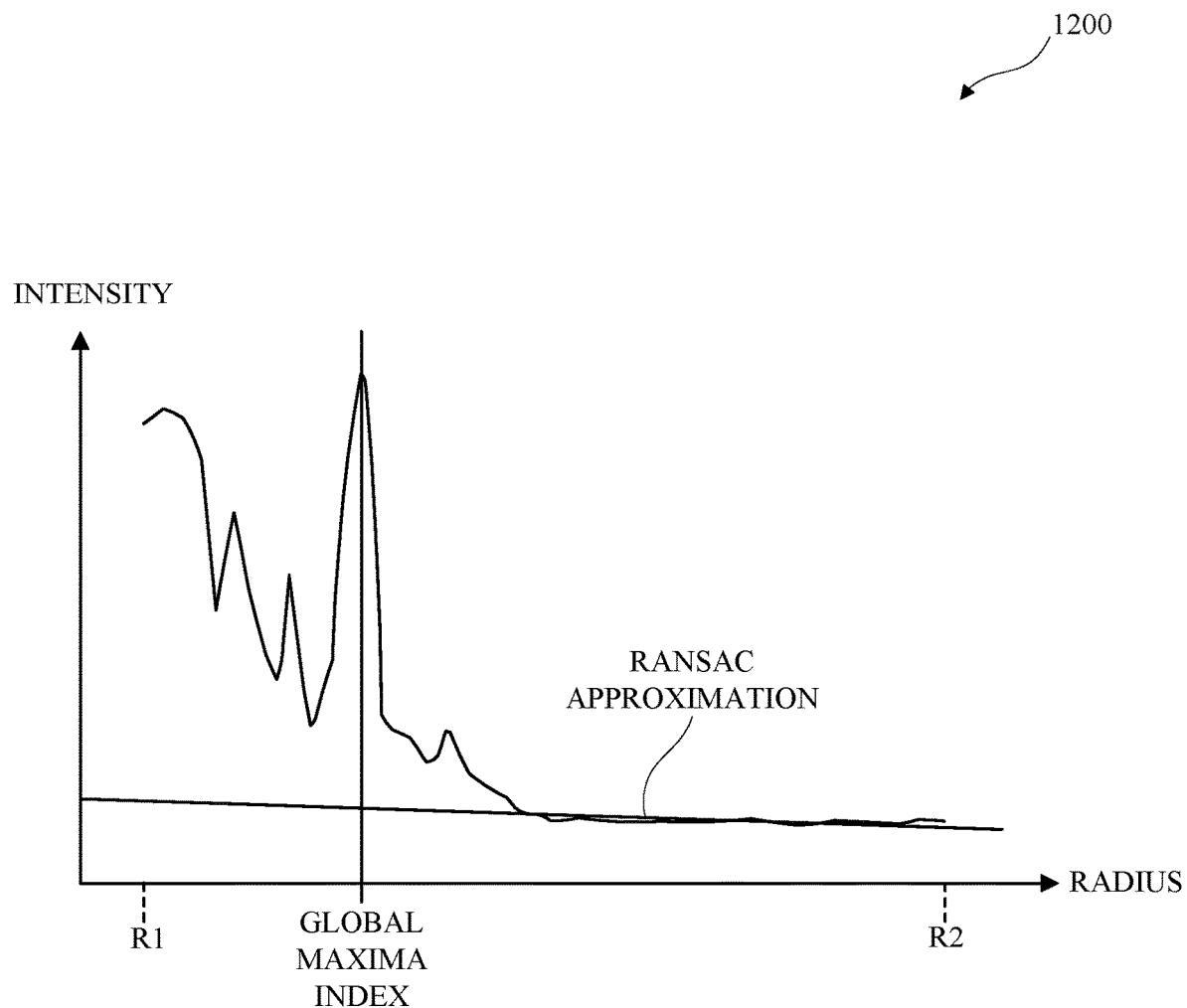
FIG. 12 is a diagram showing an example of RANSAC approximation.

The radius may be well centered around the contour to be found, such that non-content pixels are on the right side (distal from center) with enough samples. Obtaining a linear representation of the non-content pixels may include identifying an index of a global maximal intensity value, and, from the index to the end, estimating a linear representation of the values, such as using random sample consensus (RANSAC approximation). Finding the global maxima allows removal of noise in the content data. Random sample consensus may be robust to outliers, and filtering data may be omitted. A diagram showing an example of RANSAC approximation is shown in FIG. 12.

A threshold may be determined to separate non-content pixels from content pixels. RANSAC approximation may output a set of valid coordinates that are close to the linear model returned. From those coordinates, two indexes may be extracted, a smaller valid coordinate index (nLow0), and a greater valid coordinate index (nLow1). The mean and standard deviation may be obtained for the data corresponding to an index in [nLow0, nLow1]. Obtaining the threshold may be expressed as the following:

$$\tau = \mu + 3\sigma.$$

A difference approach may be used to determine a range of the border pixels. Determining the range may include obtaining a first meaningful slope just before the non-context pixels. Determining the range may include determining a derivative (difference) for each element of the radius up to nLow0. A value nUpp1 may be identified as an index of the first value below nLow0 that is greater than the threshold. Using nUpp1, a value nUpp0 may be identified as a first index from which the derivative is greater than a defined threshold. The defined threshold may correspond to omitting consideration for points in the non-content area that may have passed the threshold. The value nUpp0 may be the index for the local maxima near nUpp1 on its left side. The index nDMax, which may have the highest derivative in [nUpp0, nUpp1] may be obtained. Using the index nDMax the first index nUpp0 (to the left) having a derivative below a target may be obtained, wherein the target may be expressed as the following:

$$\frac{1}{2}\partial r(n\text{DMax}).$$

Figure 13:
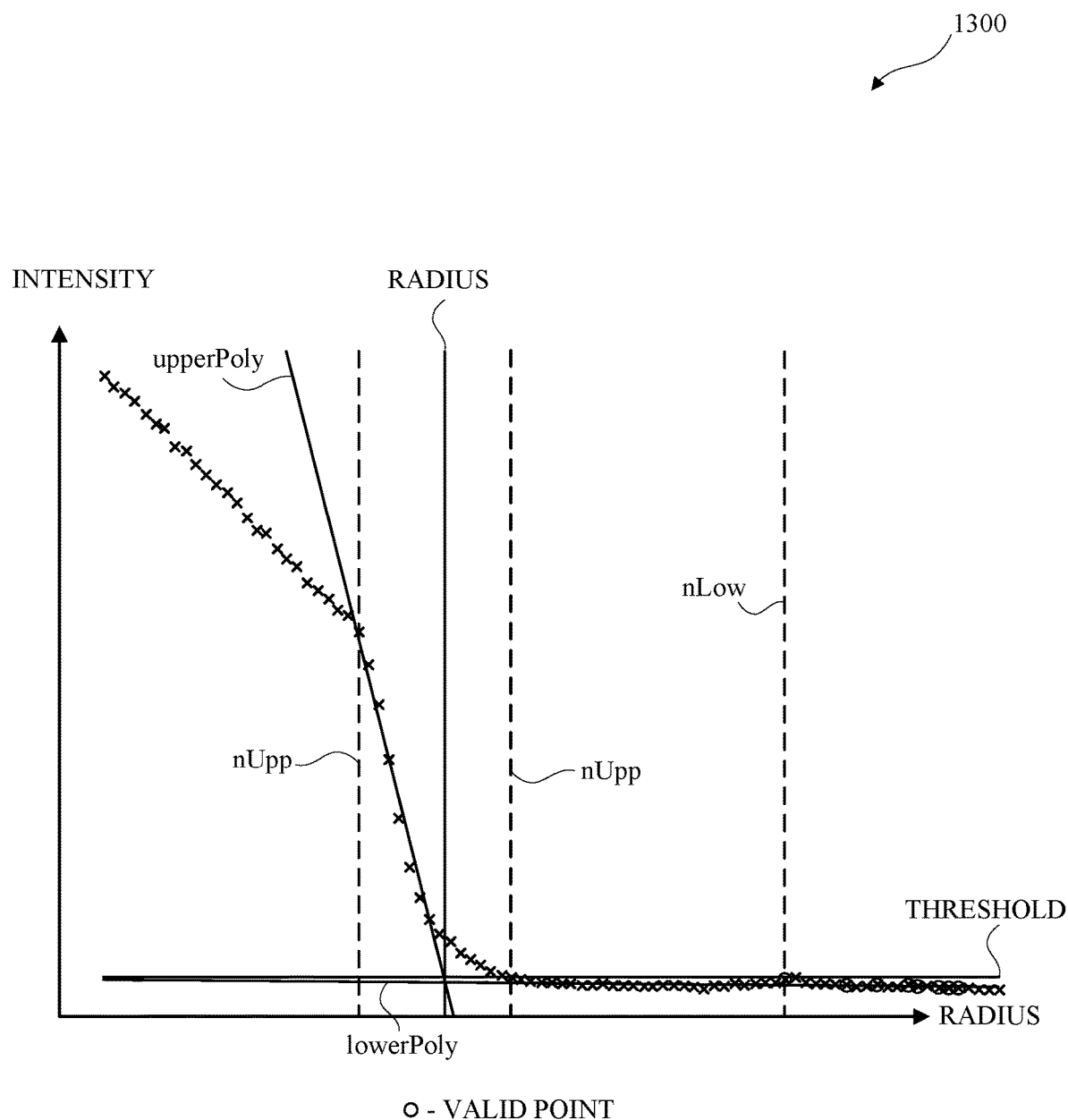
FIG. 13 is a diagram showing an example of filtering over a derivative.

Filtering over derivative allows to stay in the main slope. A diagram showing an example of filtering over derivative is shown in FIG. 13.

In some implementations, because of the shape of the slope, fitting and a RANSAC linear approximation may be unavailable or less accurate than weighted linear fitting, wherein weights are defined by the derivative values, which may allow more weight to be allocated to the beginning of the slope. The position of the contour is estimated as the intersection of the linear approximation, which is similar to the diagram showing an example of identifying the contour position using the slope is shown in FIG. 11.

The implementations of the sub-element of obtaining contours that include the linear approximation intersection may obtain a floating-point value. The implementations of the sub-element of obtaining contours that include the linear approximation intersection may include defining the contour using the slope. The implementations of the sub-element of obtaining contours that include the linear approximation intersection may iterating statistics estimation. The implementations of the sub-element of obtaining contours that include the linear approximation intersection may depend on a postulate over the profile.

Figure 14:
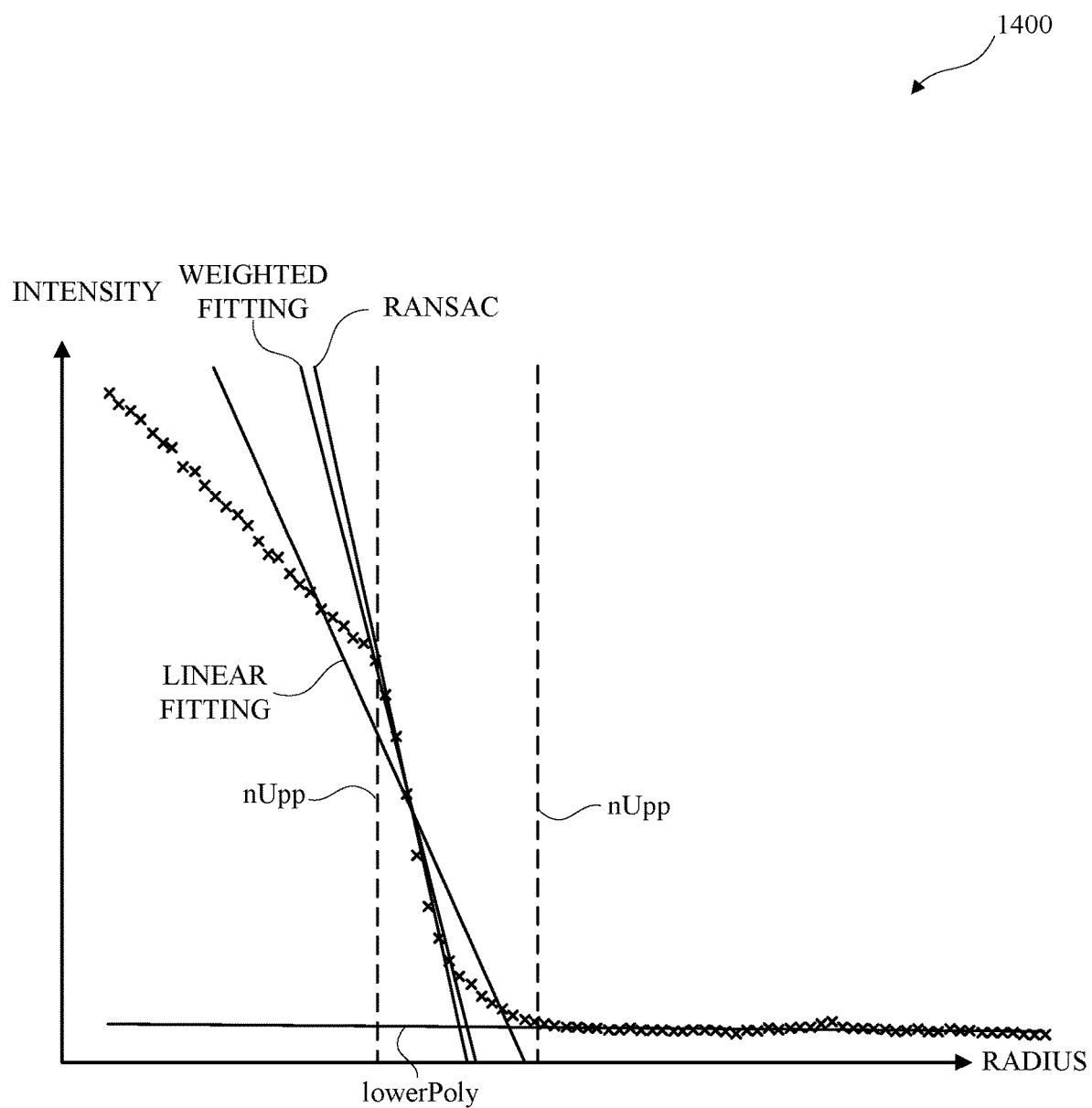
FIGS. 14-16 show diagrams of examples comparing fitting implementations for implementations of the sub-element of obtaining contours using the intersection technique.
Figure 15:
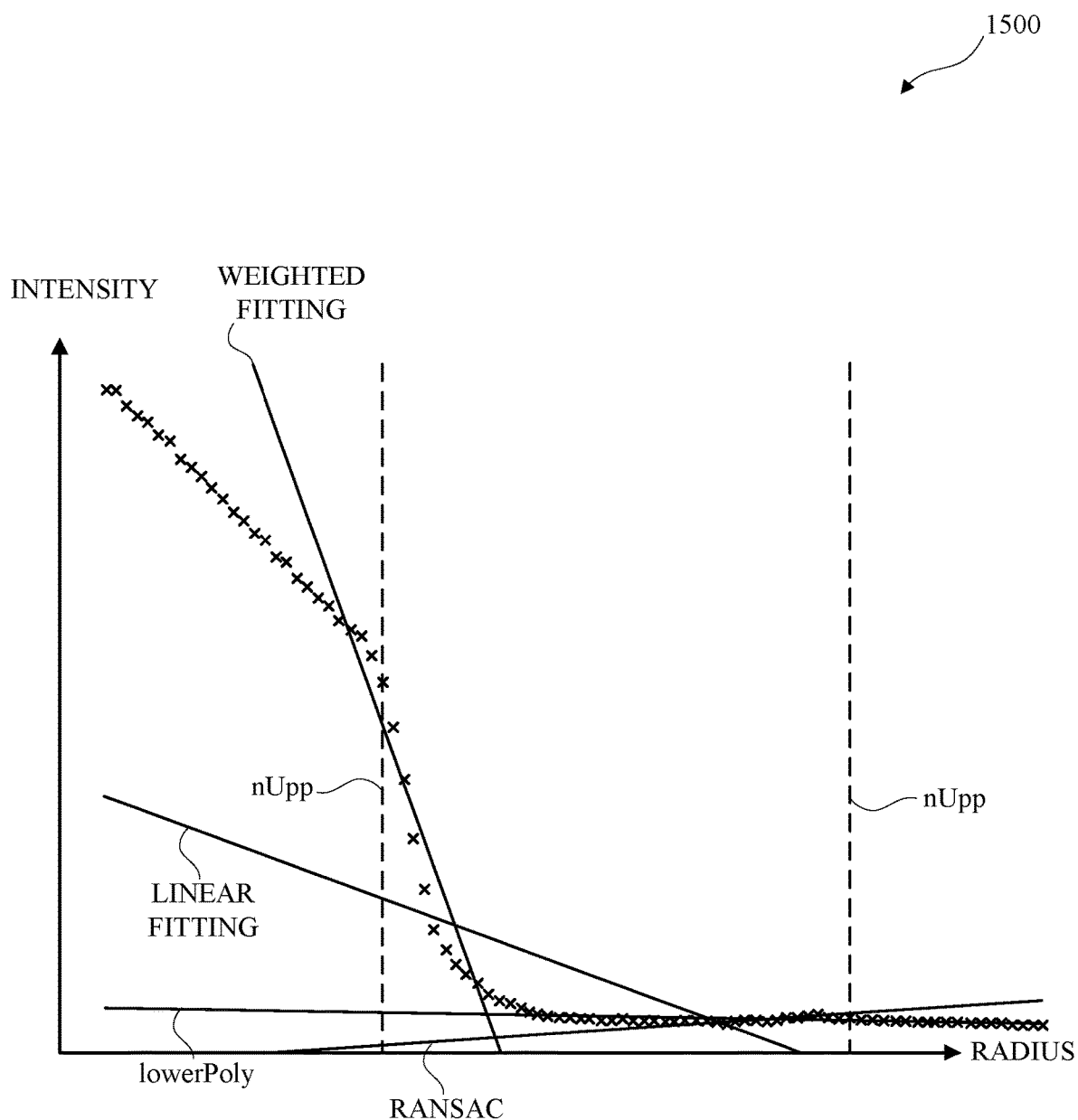
Figure 16:
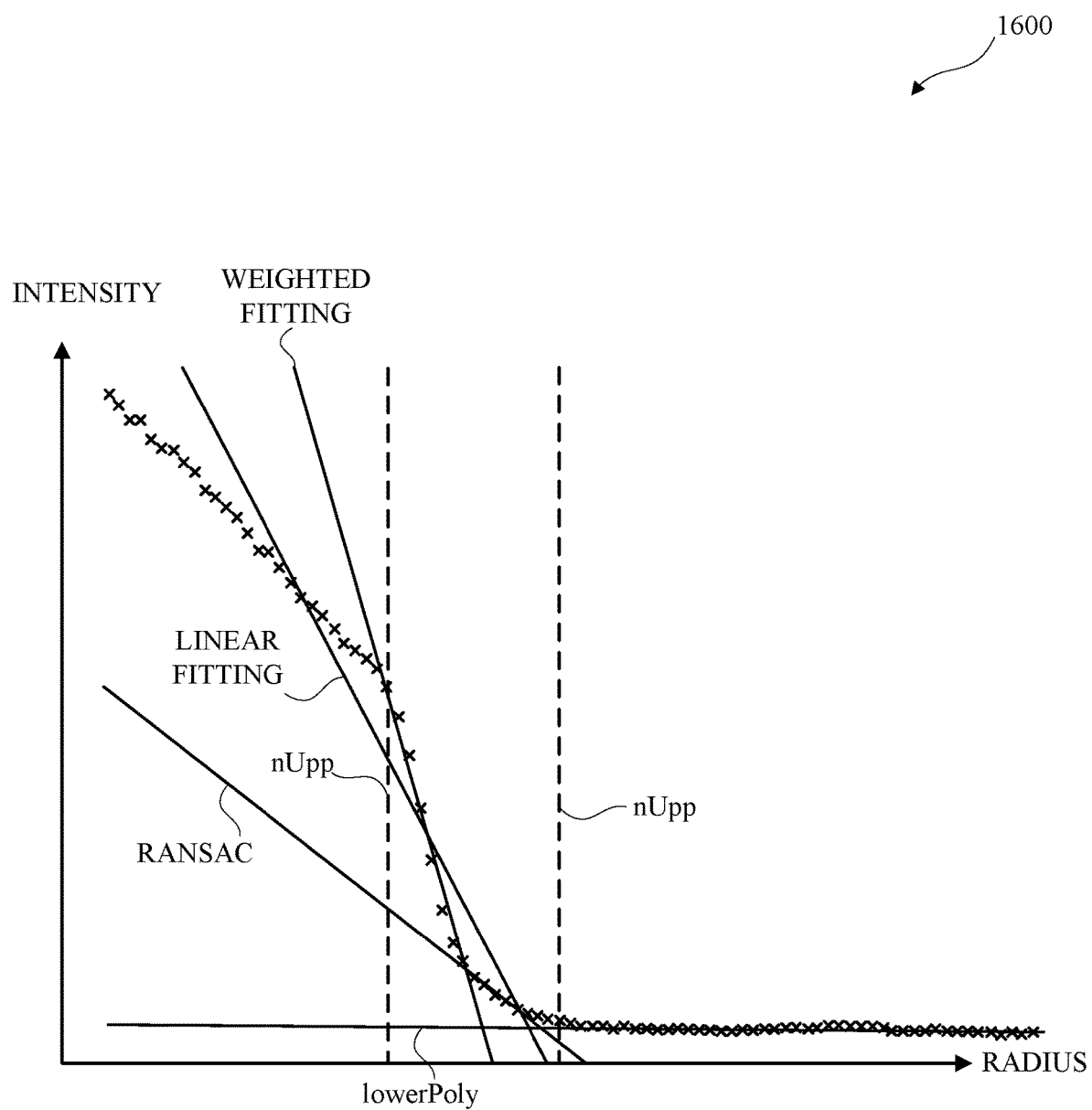

FIGS. 14-16 show diagrams of examples comparing linear fitting, RANSAC linear approximation, and weighted linear fitting for implementations of the sub-element of obtaining contours using the intersection technique.

The circle may be estimated (circle estimation) at 450. One or more implementations of the sub-element of circle estimation may include area circle estimation at 452. One or more implementations of the sub-element of circle estimation may include fitting circle estimation at 454. One or more implementations of the sub-element of circle estimation may include RANSAC circle estimation at 456. One or more implementations of the sub-element of circle estimation may include ellipse circle estimation at 458.

One or more implementations of the sub-element of circle estimation may include area circle estimation at 452. Implementations of the sub-element of circle estimation including area circle estimation may include identifying an optimized subpixel position which minimizes a robust error fitting measure.

Implementations of the sub-element of circle estimation including area circle estimation may, advantageously, find the pixel that minimizes the objective function, which may not necessarily be linear or convex, but can have an expression that can be computed. Implementations of the sub-element of circle estimation including area circle estimation may include evaluating the values of errors in a big enough neighborhood of the current circle center. The accuracy may be subpixel and may correspond to a defined sub-resolution. High center accuracy may have lower priority than robustness of the algorithm over possible outliers.

A Median of Absolute Deviation (MAD) may be obtained from a set of 2D points ($X_i$) of circle contours, where median( ) indicates the median operator, which may be expressed as the following:

$D_i = d(X_i, M) = \|x_i M\|$;

radius($M$)=median($D_i$);

error($M$)=MAD($D_i$)=median(|$D_i$−median($D_i$)|)=median(|$D_i$−radius($M$)|).

Implementations of the sub-element of circle estimation including area circle estimation may consider that the contours points may have multiple outliers and may set the estimated radius to the median of the distances from the current pixel and the contour positions. The error is the absolute difference between the distance to the contours point and the estimated radius. To discard outliers in the error measure, the median of the errors is used instead of the mean value.

In some embodiments, the error may use the mean value of absolute differences to take into account the values. The median may discard values that are not really outliers. The contours may contain more biased than non-biased positions which may lead the robust methods to discard the non-biased positions. A confidence value associated to each contour position may be used.

To obtain subpixel accuracy with minimal processing, the algorithm may run in two passes. A first pass may include obtaining, such as computing, error for the pixels in a 129×129 pixels area (2*64+1), which may include a look up to a +/−64 pixels displacement in X and Y, which may be computed quickly, such as using a numpy (about 20 ms) and may select the pixel position with minimal error. A second pass may include evaluating for a subpixel position around the best pixel found, which may include evaluating at one-pixel displacement with subdivision equal to the input down-sampling factor. The speed of this algorithm may be improved by using a multiscale strategy with initial scales evaluating pixels separated by several pixels distance.

One or more implementations of the sub-element of circle estimation may include fitting circle estimation at 454. Implementations of the sub-element of circle estimation including fitting circle estimation may include minimizing an objective function based on the circle equation and using scipy optimize( ).

Implementations of the sub-element of circle estimation including fitting circle estimation may work better if outliers are removed from the pool of contour estimation, as they won't impact too much the result. Some outliers may not perturb the result because of the minimization approach.

Implementations of the sub-element of circle estimation including fitting circle estimation may minimize the equation of a circle based on the set of contours positions. For a set $(\{x_i, y_i\}_{i \in [0,N-1]})$ of Euclidean coordinates obtained from contour estimation, minimization may be expressed as the following:

$$\min_{r,c_x,c_y} \sum_{i=0}^{N-1} ((x_i - x_c)^2 + (y_i - y_c)^2 - r^2)^2.$$

As this minimization is not linear, a simple exact formula may be unavailable, and therefore the minimization is numerical rather than analytical. The minimization may include using the scipy.optimize.minimize function. Implementations of the sub-element of circle estimation including fitting circle estimation may obtain a floating-precision result. The minimize function may be tuned, for example by using different weights for respective coordinates based for instance on a confidence metric output by the contour estimation function.

One or more implementations of the sub-element of circle estimation may include RANSAC circle estimation at 456. Implementations of the sub-element of circle estimation including RANSAC circle estimation may include selecting randomly sets of three points defining circle centers, computing associated errors, and selecting the center with the lowest error.

Implementations of the sub-element of circle estimation including RANSAC circle estimation may include randomly selecting three points from the set, estimating the circle described by the selected points, and computing the error between estimated circle and points of the set close to estimated circle. Implementations of the sub-element of circle estimation including RANSAC circle estimation may iterate on the process to minimize the error. Implementations of the sub-element of circle estimation including RANSAC circle estimation may be relatively robust to outliers and may omit outlier removal.

One or more implementations of the sub-element of circle estimation may include ellipse circle estimation at 458. Implementations of the sub-element of circle estimation including ellipse circle estimation may include using an OpenCV ellipse fitting algorithm.

Implementations of the sub-element of circle estimation including ellipse circle estimation may include obtaining the ellipse that fits (in a least-squares sense) a set of 2D points best and may obtain a rotated rectangle in which the ellipse is inscribed. Implementations of the sub-element of circle estimation including ellipse circle estimation may lack robustness to outliers, but may be used to measure, in images with few outliers, how much the circle deviates from a circular shape and is more elliptic.

Outliers may be omitted at 460. Because of input image conditions, such as noise, dark areas near the image circle, flare, and the like, some contour estimations may be erroneous and impact the estimation of the circle. Therefore, outliers may be omitted at 460. Omitting outliers may include estimating the circle from a list of contour position, removing wrong position from the list, based on the estimated circle, and iterating while at least one outlier is found.

One or more implementations of the sub-element of omitting outliers may include omitting outliers based on standard deviation at 462. Implementations of the sub-element of omitting outliers including omitting outliers based on standard deviation may include, for points, such as each point, of the list of contour position, the distance to the previously estimated center of the circle may be obtained, such as determined. Then the standard deviation may be obtained, such as determined over the list of distances, and the points outside of [−3σ, 3σ] may be omitted, such as removed from the list.

One or more implementations of the sub-element of omitting outliers may include omitting outliers based on the distance to the circle at 464. Implementations of the sub-element of omitting outliers including omitting outliers based on the distance to the circle may include obtaining the distance to the estimated center for points, such as each point, in the list of contour position. The distance may be equivalent to a radius value. The radii may be compared to the estimated radius, and the radii, other than the radii that are close in percentage, others will be removed, which may be expressed as $|d_i - r| < pr$, wherein $(d_i)$ indicates the distance of the current point, $(r)$ indicates the estimated radius, and $(p)$ indicates the percentage, such as 5%.

Parameters may be updated at 470. For example, the circle center and radius may be updated for a subsequent iteration as indicated by the directional broken line at 480. The ray segment size may be reduced by half, subject to a defined minimum size.

FIG. 5 is a diagram of an example of an image 500 captured using a lens of an image capture device. FIG. 5 shows a representation of an image 500. The image 500 may be an input image captured by the image capture device using the lens, a greyscale input image obtained from the input image, a downsampled input image obtained from the input image, or a downsampled greyscale input image obtained from the input image.

The image 500 includes a representation of a content portion 510, indicated by a sparsely stippled background. The image 500 includes representations of non-content portions 520, indicated by a densely stippled background.

The content portion 510 of the image 500 represented by FIG. 5 includes content pixels corresponding to the scene captured by the image 500. A pixel may have a value, or intensity, in a defined range from a minimal intensity value corresponding to the color black or an absence of light, to a maximal intensity value corresponding to the color white. The content pixels in the content portion 510 may have high intensity values and variance relative to the non-content portion 520.

The non-content portions 520 include image data that includes dark, such as black or near black, pixels (non-content pixels). The non-content pixels may include optical noise from the image capture device. In some embodiments, the non-content portions 520 may include image capture artifacts, such as lens flare, such that some non-content pixels may have relatively high intensity values. The non-content portions 520 omit content or pixels corresponding to the scene captured by the image.

As indicated by the position of the content portion 510 within the image 500, the physical alignment of the lens and the image sensor of the image capture device may differ.

FIG. 6A is a diagram of an example for an iteration of calibrating an image capture device 600 including estimating a calibration circle 610 for obtaining an optical center of a lens of the image capture device. FIG. 6A shows the image 500 shown in FIG. 5, including the content portion 510 and the non-content portions 520. For clarity, a small black circle is shown superimposed on the image 500 to represent the geometric center 610 of the image 500, which may correspond with the middle pixel of the image 500. For clarity, a white diamond crossed with an x is shown superimposed on the image 500 to represent the content center 620 of the content portion 510, corresponding to the optical center of the lens.

As indicated by the position of the content center 620 of the content portion 510 relative to the position of the geometric center 610 of the image 500, the physical alignment of the lens and the image sensor of the image capture device may differ. Prior to optical center calibration, the orientation of the lens relative to the image, or image sensor, may be unidentified.

FIG. 6A shows ray segments 630 superimposed on the image 500. The ray segments 630 are segments of rays extending from a defined calibration center. For a first, or initial iteration of calibrating the image capture device 600, wherein a previously identified calibration center is unavailable, the image center 610 may be identified as the calibration center. Although the image center 610 is shown relatively large for clarity, the calibration center may be a geometric point, or may correspond with a pixel or a sub-pixel location in the image 500. The ray segments 630 may be identified as described at 430 in FIG. 4.

The ray segments 630 have a defined length, such as the ray_segment_size, extending equidistantly along the respective ray from a defined radius. The end point of a ray segment 630 relatively near the calibration center may correspond with a minimal radius. The end point of a ray segment 630 relatively far from the calibration center may correspond with a maximal radius. For simplicity and clarity, the midpoint of a respective ray segment 630, along the corresponding ray, may be referred to herein as the radius of the ray segment 630.

Ray segments 630 extending beyond the boundaries of the image 500 may be omitted. The number, or cardinality, of ray segments 630 shown in FIG. 6A and the angle variations between ray segments 630 as shown in FIG. 6A are shown for clarity and are not necessarily representative of the number, or cardinality, of ray segments 630 used or the angle variations between ray segments 630 used. For example, a defined number, or cardinality, of ray segments 630, such as 200, and a defined angle variation, such as 1 degree or 0.5 degrees may be used.

Average intensity values may be obtained from the image data along the ray segments 630 to detect corresponding contour positions. The contour positions may correspond with the location in the image 500 where content pixels from the content portion 510 are immediately adjacent to non-content pixels from the non-content portions 520.

FIG. 6A shows a calibration circle 640 superimposed on the image 500. The calibration circle 640 may be centered on the image center 610. The calibration circle 640 may have the radius of the ray segments 630.

FIG. 6B is another diagram of an example for an iteration of calibrating an image capture device 650 including estimating a calibration circle 610 for obtaining an optical center of a lens of the image capture device. FIG. 6B is similar to FIG. 6A except as is described herein or as is otherwise clear from context. As shown in FIG. 6B the calibration circle 640 may be centered on the center 660 of a calibration circle identified by a previous iteration of calibrating the image capture device. The alignment of the calibration circle 640 with respect to the content center 620 of the content portion 510 may be relatively accurate relative to the alignment of the calibration circle 640 shown in FIG. 6A. The length of the ray segments 630 shown in FIG. 6B may be shorter than the length of the ray segments 630 shown in FIG. 6A.

Figure 17:
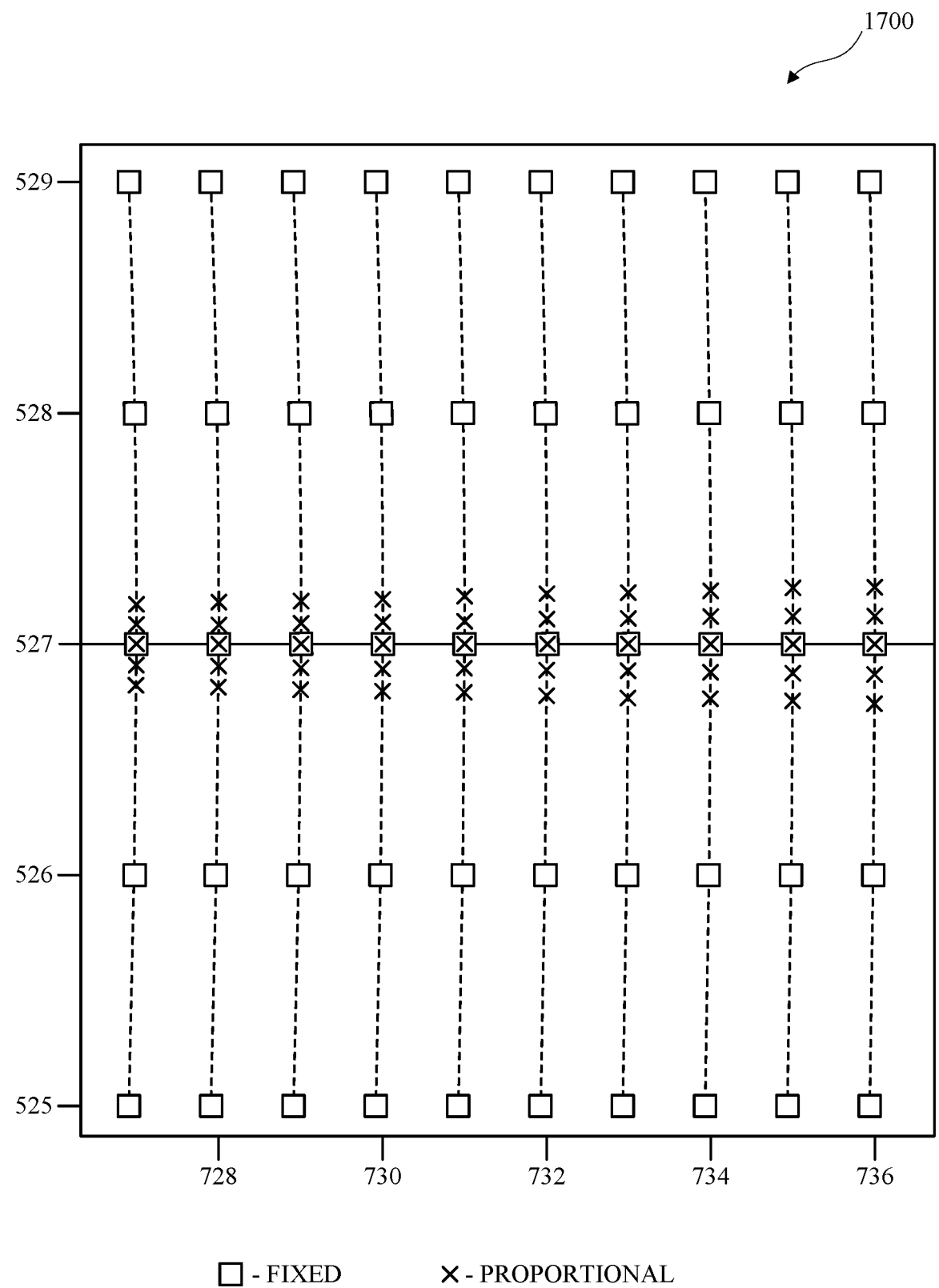
FIGS. 17-19 show diagrams of examples of respective sets of averaged pixels for implementations of the sub-element of spatial averaging using nearest-neighbor and proportional interpolation at different radii ranges.
Figure 18:
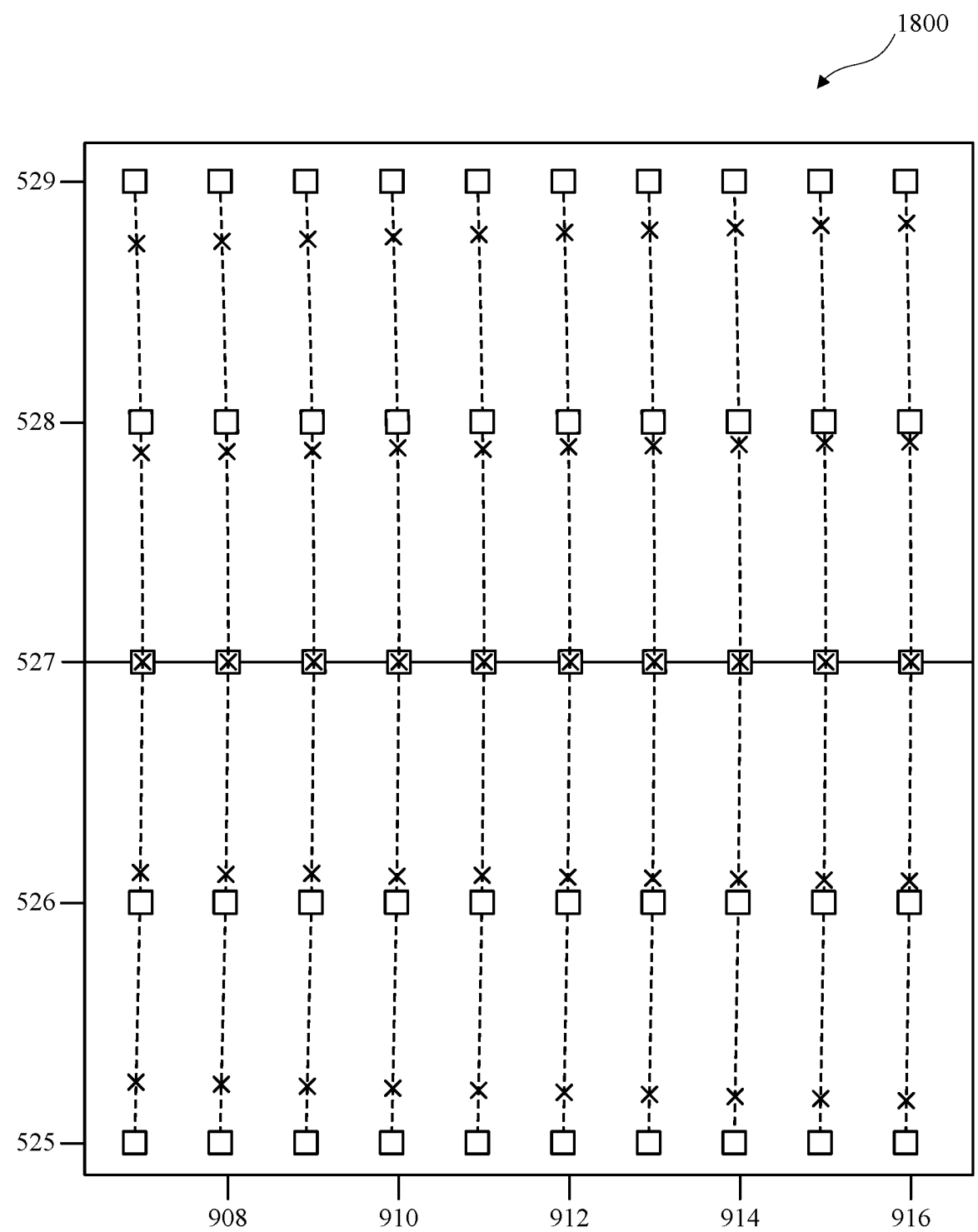
Figure 19:
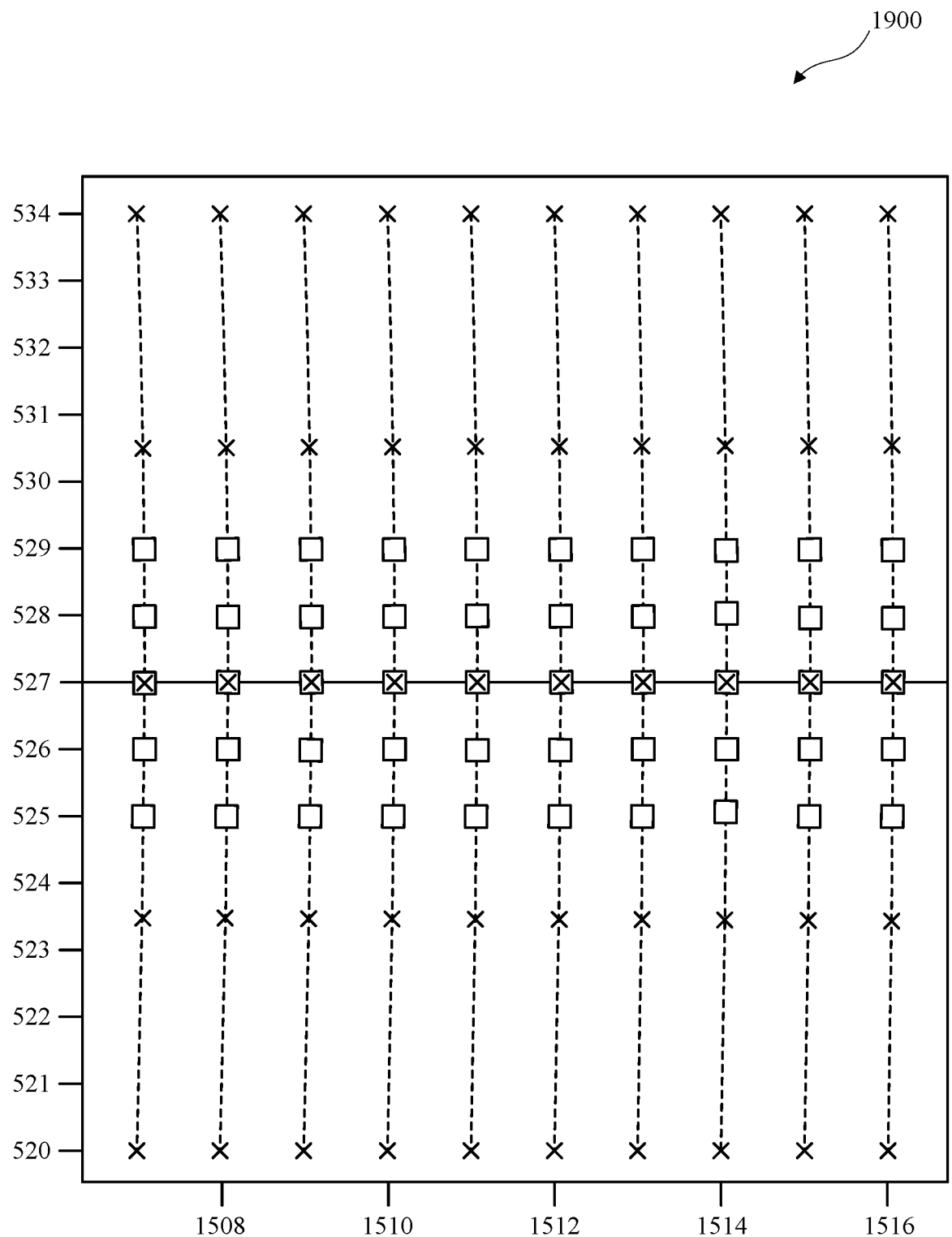

FIGS. 17-19 show examples of respective sets of pixels, such as averaged pixels, at a defined angle, such as angle=0, for implementations of the sub-element of spatial averaging using nearest-neighbor (fixed) and proportional interpolation, as shown at 432, 434 in FIG. 4, at different radii ranges. The labels shown along the X axis in FIGS. 17-19 indicate a horizontal location, such as in pixels, in the input image. The labels shown along the Y axis in FIGS. 17-19 indicate a vertical location, such as in pixels, in the input image. For example, in FIG. 17-19, the center of the input image (not shown) may be at x=707 and y=527. The horizontal line shown along the vertical location at 527 may correspond with a ray extending at the defined angle from the center. For implementations of the sub-element of spatial averaging using nearest-neighbor (fixed) interpolation, interpolation locations are show as white squares. For implementations of the sub-element of spatial averaging using proportional interpolation, interpolation locations are show as x-marks.

In the example 1700 shown in FIG. 17, radial segments (indicated by the broken lines) are shown intersecting the ray at vertical position 527 at horizontal radius offsets in the range 20-30 from the horizontal (X) position of the center, at 707 pixels horizontally (not shown). In the example 1800 shown in FIG. 18, radial segments (indicated by the broken lines) are shown intersecting the ray at vertical position 527 at horizontal radius offsets in the range 200-210 from the horizontal (X) position of the center, at 707 pixels horizontally (not shown). In the example 1900 shown in FIG. 19, radial segments (indicated by the broken lines) are shown intersecting the ray at vertical position 527 at horizontal radius offsets in the range 800-810 from the horizontal (X) position of the center, at 707 pixels horizontally (not shown).

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for optical center calibration comprising:
   obtaining one or more parameters for optical center calibration;
   obtaining an input image captured by an image capture device using a lens; and
   determining a calibration circle using the parameters and the input image, wherein determining the calibration circle includes:
      extracting rays using the input image;
      obtaining contours using the input image and the rays; and
      obtaining the calibration circle using the input image and the contours.

2. The method of claim 1, wherein determining the calibration circle includes:
   omitting outliers subsequent to obtaining the calibration circle.

3. The method of claim 2, wherein determining the calibration circle includes iteratively repeating obtaining the calibration circle and omitting outliers subsequent to obtaining the calibration circle.

4. The method of claim 2, wherein omitting outliers includes:
   omitting outliers based on deviation; or
   omitting outliers based on distance.

5. The method of claim 1, wherein optical center calibration includes iteratively repeating determining the calibration circle, wherein iteratively repeating determining the calibration circle includes:
   for a first iteration of determining the calibration circle:
      identifying a geometric center of the input image as a calibration center;
      identifying a defined minimal radius;
      identifying a defined maximal radius; and
      subsequent to determining the calibration circle:
         identifying a center of the calibration circle as an updated calibration center;
         identifying a minimal radius larger than the defined minimal radius; and
         identifying a maximal radius smaller than the defined maximal radius; and
   for a subsequent iteration of determining the calibration circle:
      using the updated calibration center as the calibration center;
      using the minimal radius;
      using the maximal radius; and
      subsequent to determining the calibration circle:
         identifying a center of the calibration circle as the updated calibration center;
         updating the minimal radius to be larger; and
         updating the maximal radius to be smaller.

6. The method of claim 1, wherein obtaining the input image includes:

obtaining a greyscale image from the input image;
obtaining a downscaled image from the greyscale image; and
using the downscaled image as the input image.

7. The method of claim 1, wherein extracting the rays includes:
nearest neighbor ray extraction; or
proportional ray extraction.

8. The method of claim 1, wherein obtaining contours includes:
average contour estimation;
hybrid contour estimation; or
intersection contour estimation.

9. The method of claim 1, wherein obtaining the calibration circle includes:
area calibration circle estimation;
fitting calibration circle estimation;
RANSAC calibration circle estimation; or
ellipse calibration circle estimation.

10. An image capture apparatus comprising:
a lens;
an image sensor configured to capture, using the lens, an input image; and
an image processor configured to:
obtain one or more parameters for optical center calibration;
obtain the input image; and
determine a calibration circle using the parameters and the input image, wherein to determine the calibration circle, the image processor is configured to:
extract rays using the input image;
obtain contours using the input image and the rays; and
obtain the calibration circle using the input image and the contours.

11. The image capture apparatus of claim 10, wherein, to determine the calibration circle, the image processor is configured to:
omit outliers subsequent to obtaining the calibration circle.

12. The image capture apparatus of claim 11, wherein, to determine the calibration circle, the image processor is configured to iteratively repeat obtaining the calibration circle and omitting outliers subsequent to obtaining the calibration circle.

13. The image capture apparatus of claim 11, wherein, to omit outliers, the image processor is configured to:
omit outliers based on deviation; or
omit outliers based on distance.

14. The image capture apparatus of claim 10, wherein the image processor is configured to iteratively repeat determining the calibration circle, such that the image processor is configured to:
for a first iteration of determining the calibration circle:
identify a geometric center of the input image as a calibration center;
identify a defined minimal radius;
identify a defined maximal radius; and
subsequent to determining the calibration circle:
identify a center of the calibration circle as an updated calibration center;
identify a minimal radius larger than the defined minimal radius; and
identify a maximal radius smaller than the defined maximal radius; and
for a subsequent iteration of determining the calibration circle:
use the updated calibration center as the calibration center;
use the minimal radius;
use the maximal radius; and
subsequent to determining the calibration circle:
identify a center of the calibration circle as the updated calibration center;
update the minimal radius to be larger; and
update the maximal radius to be smaller.

15. The image capture apparatus of claim 10, wherein, to obtain the input image, the image processor is configured to:
obtain a greyscale image from the input image;
obtain a downscaled image from the greyscale image; and
use the downscaled image as the input image.

16. The image capture apparatus of claim 10, wherein, to extract the rays, the image processor is configured to:
perform nearest neighbor ray extraction; or
perform proportional ray extraction.

17. The image capture apparatus of claim 10, wherein, to obtain contours, the image processor is configured to:
perform average contour estimation;
perform hybrid contour estimation; or
perform intersection contour estimation.

18. The image capture apparatus of claim 10, wherein, to obtain the calibration circle, the image processor is configured to:
perform area calibration circle estimation;
perform fitting calibration circle estimation;
perform RANSAC calibration circle estimation; or
perform ellipse calibration circle estimation.

19. An image capture apparatus calibration system comprising:
an image capture apparatus including:
a lens; and
an image sensor configured to capture, using the lens, an input image; and
a calibration unit including:
a processor configured to:
obtain one or more parameters for optical center calibration;
obtain the input image from the image capture apparatus; and
determine a calibration circle using the parameters and the input image, wherein, to determine the calibration circle, the processor is configured to:
extract rays using the input image;
obtain contours using the input image and the rays; and
obtain the calibration circle using the input image and the contours.

20. The image capture apparatus calibration system of claim 19, wherein, to determine the calibration circle, the processor is configured to iteratively repeat obtaining the calibration circle and omitting outliers subsequent to obtaining the calibration circle.

* * * * *